United States Patent
Nagano et al.

(10) Patent No.: US 6,210,280 B1
(45) Date of Patent: Apr. 3, 2001

(54) DAMPER DISC ASSEMBLY HAVING NON-ROTATABLE SPRING SEATS

(75) Inventors: Tamio Nagano, Hirakata; Saburo Nakanishi, Amagasaki; Yoshitaka Kitamura, Hirakata; Hideyuki Imanaka, Moriguchi; Hiroshi Uehara, Hirakata, all of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/334,274

(22) Filed: Jun. 16, 1999

Related U.S. Application Data

(62) Division of application No. 09/146,346, filed on Sep. 3, 1998, now Pat. No. 6,004,213, which is a division of application No. 08/681,426, filed on Jul. 23, 1996, now Pat. No. 5,954,585.

(30) Foreign Application Priority Data

| Jul. 24, 1995 | (JP) | 7-187037 |
| Oct. 23, 1995 | (JP) | 7-274335 |
| Dec. 21, 1995 | (JP) | 7-333596 |

(51) Int. Cl.$^7$ .................. F16D 3/12; F16D 3/66
(52) U.S. Cl. ................. 464/68; 464/64; 192/205
(58) Field of Search .............. 192/205; 464/64, 464/68, 83, 63, 66

(56) References Cited

U.S. PATENT DOCUMENTS

| 4,351,168 | 9/1982 | Prince et al. . |
| 4,613,029 | 9/1986 | Beccaris . |
| 4,685,896 | 8/1987 | Carmillet et al. . |
| 4,714,448 | 12/1987 | Focqueur et al. . |
| 4,726,454 | * 2/1988 | Aiki ..................... 192/213 |
| 4,969,855 | 11/1990 | Graton et al. . |
| 5,052,244 | 10/1991 | Kamiya et al. . |
| 5,092,820 | 3/1992 | Naudin et al. . |
| 5,156,067 | 10/1992 | Umeyama . |
| 5,169,357 | 12/1992 | Graton . |
| 5,217,409 | 6/1993 | Dalbiez . |
| 5,626,518 | 5/1997 | Maki et al. . |
| 5,655,967 | * 8/1997 | Lopez et al. ............. 464/68 |
| 5,823,516 | 10/1998 | Despres . |

* cited by examiner

Primary Examiner—Daniel P. Stodola
Assistant Examiner—Gregory J. Strimbu
(74) Attorney, Agent, or Firm—Shinjyu Global IP Counselors, LLP

(57) ABSTRACT

A pair of spring seats (32) are used at opposite ends of a small coil spring (6) disposed between a power input rotary member and a power output rotary member. Each spring seat (32) includes a receiving side surface for receiving the spring and a contacting surface (36). Each contacting surface (36) is formed with four slanting surfaces that slant inward toward a central portion of the contacting surface. The intersections of the four slanting surfaces of each spring seat define two intersecting V-shaped grooves (37, 38). The power input rotary member and the power output rotary member contact respective portions of one of the V-shaped grooves (37, 38) of each spring seat. Engagement between the rotary members and the engaged V-shaped grooves restricts movement of the spring seats (32).

7 Claims, 16 Drawing Sheets

DAMPER DISC ASSEMBLY HAVING NON-ROTATABLE SPRING SEATS

The following patent application is a division of U.S. Ser. No. 09/146,346 filed Sep. 3, 1998, now U.S. Pat. No. 6,004,213, which is a division of U.S. Ser. No. 08/681,426 filed Jul. 23, 1996, now U.S. Pat. No. 5,954,585.

BACKGROUND OF THE INVENTION

1. Field of the Invention

The present invention relates to a damper disc assembly that employs both elastic members and friction members for dampening vibration. In particular the invention relates to an improved friction member and improved spring seats used with the elastic members.

2. Description of the Related Art

A clutch disc assembly for use in, for example, an automotive vehicle is typically provided with a disc-like power input plate, an power output hub formed with a radially extending flange, and coil springs disposed between the power input plate and the power output hub so as to limit the relative displacement between them. Alternatively, a separate hub/intermediate plate type damper disc assembly may also be provided. In this type of damper disc assembly, the conventional flange portion is separated from the hub portion and coil springs of low rigidity couple the separated flange and the hub portion.

In the separate hub/intermediate plate type damper disc assembly, the coil springs for coupling the separated flange and the hub portion are disposed within a receptacle formed in the flange portion of the hub side and a receptacle formed in the separated flange. Spring seats are provided on opposite sides of the coil spring. The end surface on the outer circumferential side in the circumferential direction of the spring seat is in contact with the receptacle portion of the flange portion of the hub side and the receptacle portion of the separated flange, respectively.

In the conventional spring seat used in the clutch disc assembly described above, the portion which the receptacles of the separated flange and the flange portion of the hub contact is made a slanting surface with V-shaped cross section. This slanting surface gradually lowers from the radially opposite sides to the inner circumferential side of the spring seat. In other words, the bottom of two of the slanting surfaces extends in the axial direction of the spring seat. The receptacle portion of the flange portion of the hub side and the receptacle portion of the separated flange extend towards the circumferential inner side and are in contact with each of two slanting surfaces, respectively.

When assembling a damper disc, the spring seat is typically already attached to opposite ends of the coil spring. The operators in the assembling line position the spring seats and coil spring within the space defined by the receptacle of the flange portion of the hub and the receptacle of the separated flange. At this time, the spring seat must be properly oriented for installation so that the slanting surface with V-shaped cross section corresponds to each slanting portion of receptacles of the flange portions of the hub side and the separated flange. In other words, the orientation of the spring seats is critical during installation. For example, if the spring seat turned by 90 degrees with respect to the correct orientation, it can not be installed. For this reason, the operators need to be careful about the orientation of the spring seats during installation. The necessity of proper orientation is an opportunity for error and may contribute to operational inefficiencies during assembly.

In other clutch disc assemblies a disc-like power input plate is provided along with a power output hub having a flange integral with its outer circumferential portion, and coil springs disposed between the power input plate and the flange so as to limit the relative displacement therebetween. The flange is provided with window holes formed by, for instance, die-cutting for receiving coil springs. The circumferentially opposite ends of the coil springs are in contact with the respective edge of the window hole. Support portions for supporting the circumferencially opposite ends of the coil spring is formed on the power input plate. With this configuration, when the power input plate are rotated, the torque is transmitted to the hub through the coil springs.

Alternatively, a separate hub/intermediate plate type clutch disc assembly have also been provided. In this type of clutch disc assembly, the conventional flange portion is separated from the hub portion and is couple to it by mean of the coil springs. In this type of clutch disc assembly, a larger twist angular displacement can be produced, and further, two levels of the characteristics of torsion can be obtained. A pair of the spring seats is disposed on the opposite ends of the small coil spring. The flange portion and the hub portion are provided with gear teeth which are circumferentially spaced apart from each other and the gear teeth of the flange portion and the gear teeth of the hub engage together with each other.

In the above described clutch disc assembly described above, the gear teeth of the hub portion are offset toward on the negative side (in the direction opposite to the rotational direction) by positioning off center between each of the gear teeth of the flange portion in a torsion free state. In other words, the amount of twist angular displacement of the hub portion with respect to the flange portion is larger on the positive side (in the rotational direction) and smaller on the negative side.

Such a configuration, under certain conditions, causes unpleasant sounds. It is possible to reduce these sounds by altering the characteristics of twist angular displacement depending on the type/model of the automotive vehicles. Altering the characteristics of twist angular displacement can be carried out by modifying the configurations of the flange portion and the hub portion, however, the production costs associated with manufacturing modified parts is prohibitive.

The above described clutch disc assembly also includes a hysteresis torque generating mechanism which includes friction elements which can be is pressing contact with the flange of hub and conical springs for pressing the friction elements against the flange.

It is desirable that the friction elements of the hysteresis torque generating mechanism are not rotatable relative to either one of the power input plate or the flange for stabilizing the hysteresis torque. Further, in view of operation efficiency, it is desirable that the hysteresis torque generating mechanism is integrally attached to either one of the power input plate or the power output hub.

The friction element with engaging portion engagable with the power input plate and prohibiting the relative rotation with respect to it has been provided. In this device, the friction element and conical spring are integrally mounted to the power input plate by means of the engaging portion.

With this arrangement, the friction element always rotates relative to the power output hub during operation, so that the hysteresis torque generated is stabilized. Further, since the friction element and conical spring are integrally mounted to the power input plate, the devices are portable as one unit, thereby enhancing operation efficiency.

The engaging portion of the friction element described above is elastic and its inter-fitting portion which axially extends is configured to be inter-fitted into the aperture formed on the power input plate. For this reason, the friction element of this type is normally formed by resin molding.

However, since the friction element of resin generally has a low friction coefficient, the sufficient amount of the friction force can not be obtained and, especially, the shock upon speedup/slowdown can not be efficiently absorbed. Also, in the initial condition, since the friction elements do not uniformly contact the power input plate, the friction coefficient becomes unstable. As a result, the desirable amount of the hysteresis torque can not be obtained.

SUMMARY OF THE INVENTION

One object of the present invention is to reduce the possibility of errors during assembly of a damper disc and its components.

In accordance with one aspect of the present invention, a spring seat includes a spring seat body formed with a contact surface and a receiving surface, each of the surfaces being formed on respective opposite sides of the spring seat body. A projecting portion is formed on the receiving surface and extends from a center of the receiving surface. The projecting portion has a generally cylindrical shape and coincides with a central axis of the spring seat body. The contact surface is formed with two slanting grooves with each of the slanting grooves generally defining a V-shape in cross section. The slanting grooves define four quadrants on the contact surface. The four quadrants and the slanting grooves define a central depression and each of the slanting grooves intersects at the central axis.

Preferably, each of the contact surface and the receiving surface having a generally square shape.

In accordance with another aspect of the present invention, a damper disk assembly includes a hub formed with a flange portion. The flange portion is formed with at least one receptacle on an outer circumferential portion thereof. A sub-plate has a central aperture. The sub-plate is disposed about the hub with the hub extending concentrically through the central aperture. The sub-plate is formed with at least one receptacle on an inner circumferential portion of the central aperture. The sub-plats receptacle generally corresponds in size and shape to the hub receptacle. A spring is disposed in the sub-plate receptacle and the hub receptacle elastically coupling the sub-plate to the hub. The damper disk assembly further includes a pair of spring seats, each of the spring seats having a spring seat body formed with a contact surface and a receiving surface. Each of the surfaces is formed on respective opposite sides of the spring seat body. A projecting portion is formed on the receiving surface and extends from a center of the receiving surface. The projecting portion has a generally cylindrical shape and coincides with a central axis of the spring seat body. The contact surface is formed with two slanting grooves. Each of the slanting grooves generally defines a V-shape in cross section. The slanting grooves define four quadrants on the contact surface. The four quadrants and the slanting grooves define a central depression. Each of the slanting grooves intersects at the central axis. Further, one of the spring scats is disposed at each end of the spring within the sub-plate receptacle and the hub receptacle. The projecting portion at least partially extends into the spring and the receiving surface engages the end of the spring. One of the slanting grooves engages a portion of the sub-plate receptacle and a portion of the hub receptacle thereby preventing rotation of the spring seats with respect to the sub-plate receptacle and the hub receptacle.

Preferably, each of the contact surface and the receiving surface have a generally square shape.

Preferably, the slanting grooves are configured for engagement with the portion of the sub-plate receptacle and the portion of the hub receptacle in any one of four perpendicular positions. The four perpendicular positions are defined about the central axis of the projecting portion, whereby any one of the four perpendicular positions may be achieved in response to rotation of the spring seats about the central axis during installation.

These and other objects, features, aspects and advantages of the present invention will become more fully apparent from the following detailed description of the present invention when taken in conjunction with the accompanying drawings where like reference numerals denote corresponding parts throughout, in which:

BRIEF DESCRIPTION OF THE DRAWINGS

FIG. 1 is a section view taken along the line I—I in FIG. 2;

FIG. 7 is a section line taken along the line VII—VII in FIG. 8;

DESCRIPTION OF THE PREFERRED EMBODIMENTS

First Embodiment

Figure 1:
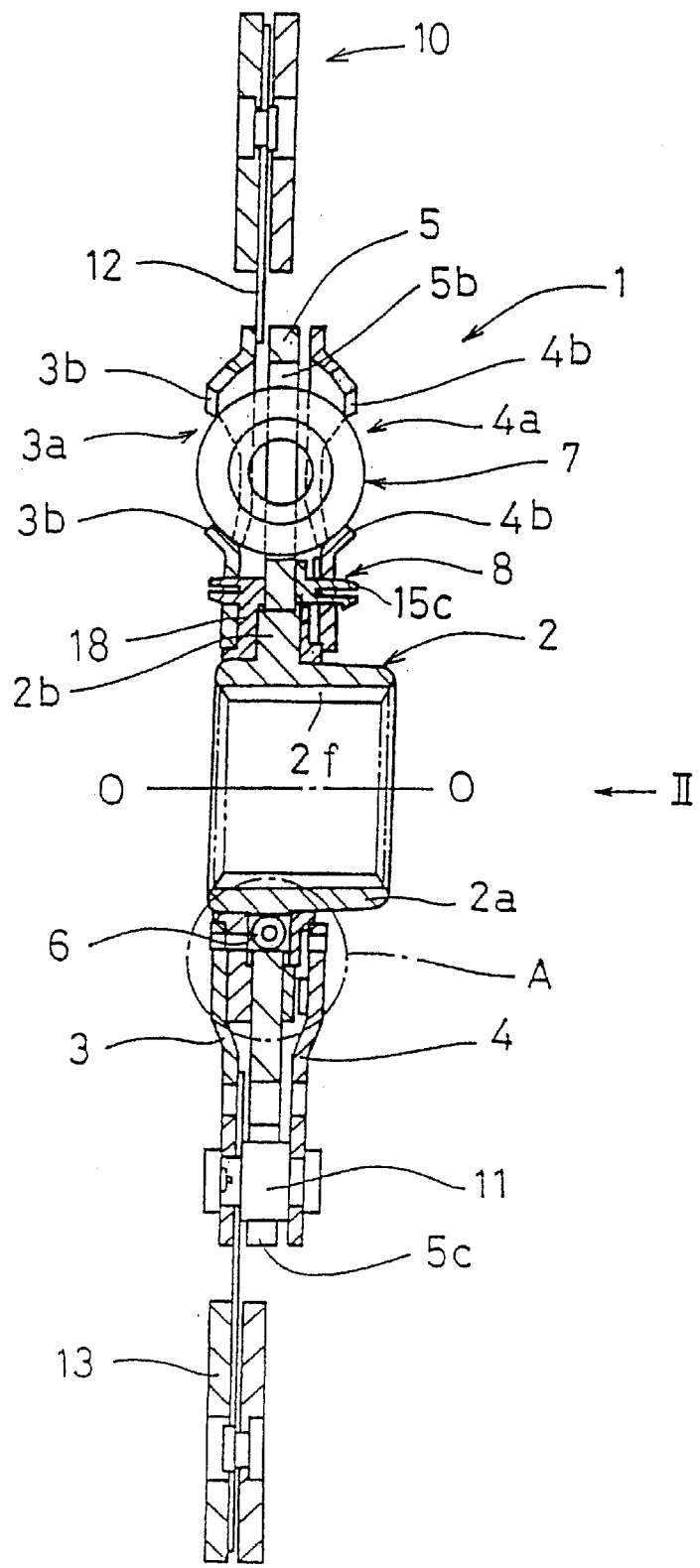
FIG. 1 is a side sectional view showing a clutch disc assembly in accordance with a first embodiment of the present invention.

A clutch disc assembly 1 according to one embodiment of the present invention is shown in FIG. 1. The clutch disc assembly 1 is used to transmit a torque from an engine (not shown) located on the left side of FIG. 1 to a transmission (not shown) located on the right side of FIG. 1. In FIG. 1, line O—O designates a rotary axis of the clutch disc assembly 1.

The clutch disc assembly 1 includes a hub 2 which serves as a power output element, a clutch disc 3 and a retaining plate 4 which together serve as power input elements, a sub-plate 5 which serves as an intermediate element, small coil springs 6 disposed between the sub-plate 5 and the hub 2 so as to limit the relative displacement between them, large coil springs 7 disposed between the plates 3 and 4 and the sub-plate 5 so as to limit the relative displacement between them, and a friction resistance generating mechanism 8 to produce the predetermined amount of hysteresis torque upon the relative rotation between the plates 3 and 4 and the hub 2. The large coil springs 7 include a first spring assembly 7a and a second spring assembly 7b.

Figure 2:
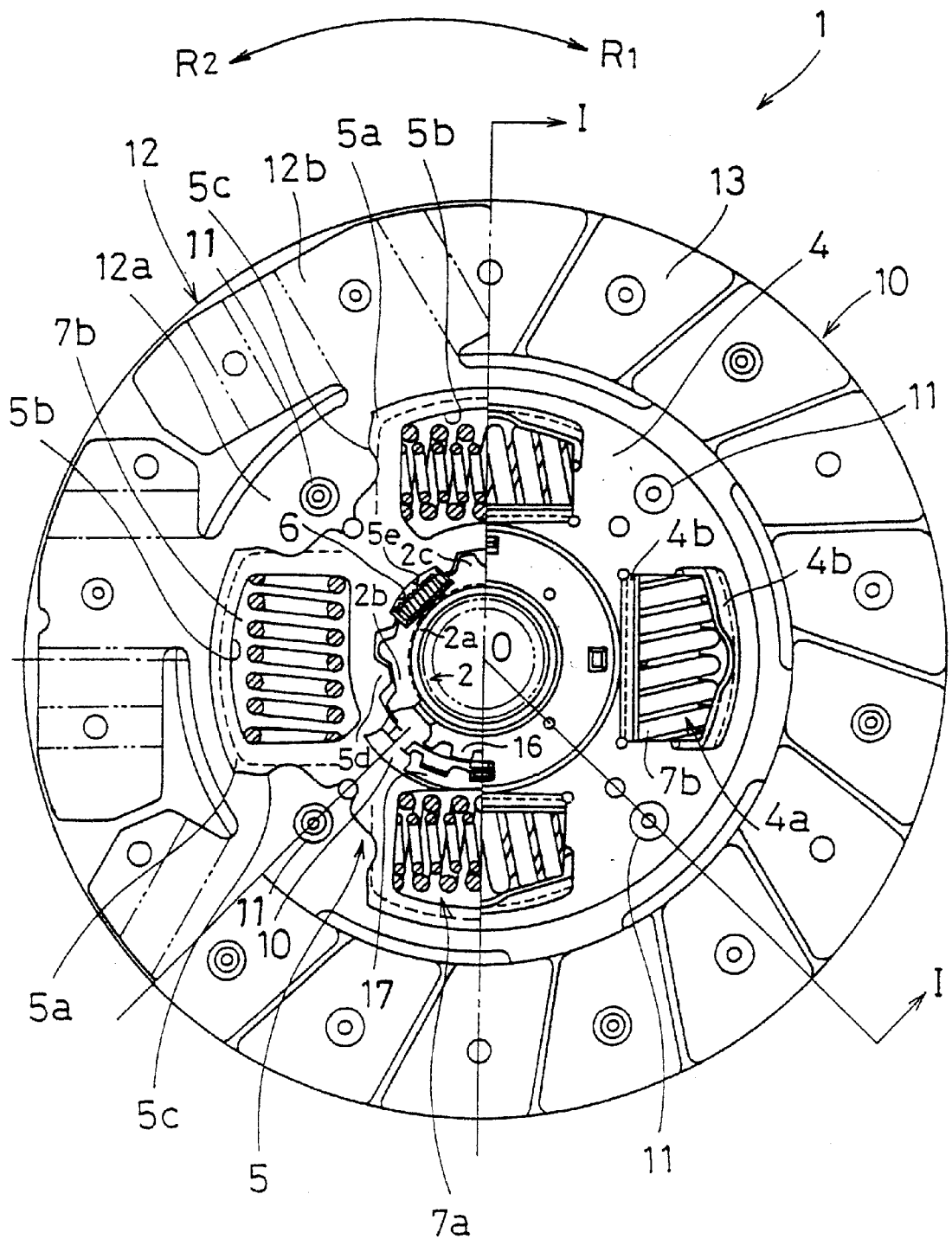
FIG. 2 is a part elevation, part cutaway view of the clutch disc assembly depicted in FIG. 1, looking in the direction of the arrow II of FIG. 1.
Figure 3:
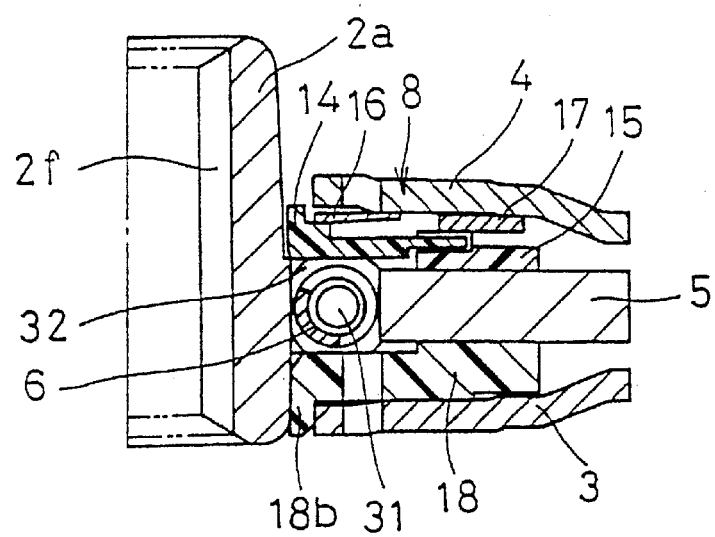
FIG. 3 is fragmentary view of the clutch disc assembly showing the portion A in FIG. 1, on a slightly enlarged scale, with details of a friction mechanism of the clutch disc assembly.

A hub 2 which is connectable to a shaft (not shown) of the transmission is disposed at the center of the clutch disc assembly 1. The hub 2 includes a cylindrical boss 2a which axially extends and a flange portion 2b integral with the outer circumference of the boss 2a. The spline hole 2f which is spline-engaged with the shaft (not shown) of the transmission is formed on the inner circumferential side of the boss 2a. The flange portion 2b, as shown in FIG. 2, is provided with a plurality of outer circumferencial gear teeth 2c which extend radially outwardly. Inner circumferencial gear teeth 5d formed on the inner circumferential portion of the separated flange 5 correspond to the portions between each of the outer circumferencial gear teeth 2c. A predetermined gap is provided between each of the outer circumferencial gear teeth 2c and the inner circumferencial gear teeth 5d in the circumferential direction.

Figure 4:
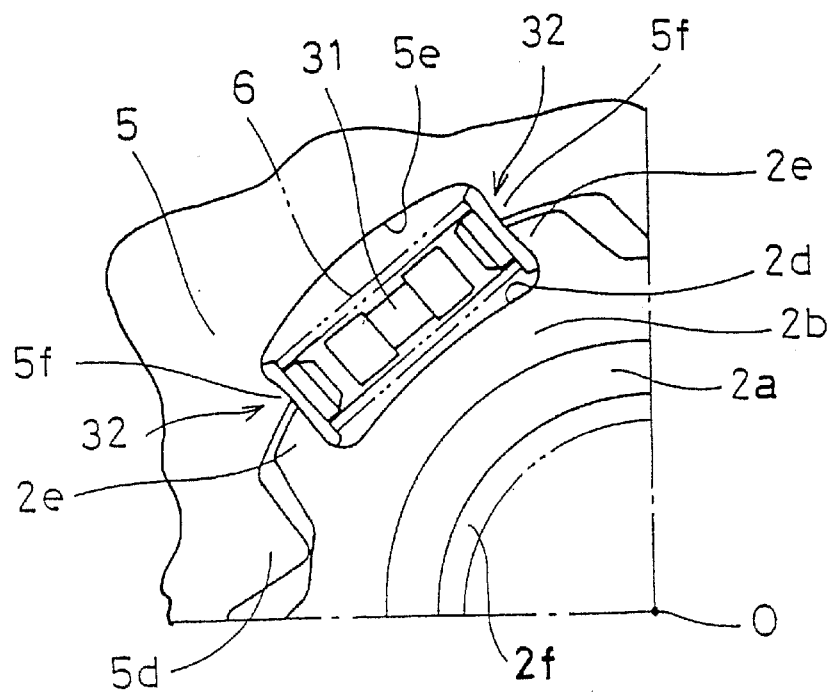
FIG. 4 is a fragmentary view of a portion of FIG. 2, on a slightly enlarged scale, showing details of an elastic member and corresponding spring seats of the clutch disc assembly.

As shown in FIG. 4, receptacles 2d are formed at two diametrically opposite positions in the flange portion 2b. The support portions 2e formed on the opposite sides in the circumferential direction of the receptacles 2d are circumferentially tapered.

A sub-plate 5 (a separated flange) is disposed on the outer circumference of the flange portion 2b of the hub 2 and is disposed in the same plane as the flange portion 2b of the hub 2. The sub-plate 5 is a disc-shaped plate. The sub-plate 5, as is apparent from FIG. 2, includes four extending portions 5a which extend radially outwardly. Each of the extending portions 5a is provided with a circumferentially extending window hole 5b. Outside cutaways 5c are provided between each of the extending portions 5a.

Figure 5:
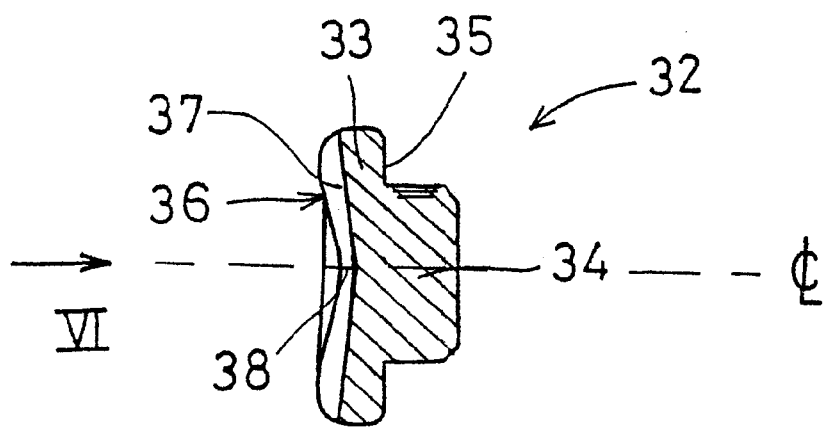
FIG. 5 is a side view of the spring seat depicted in FIG. 4, shown removed from the clutch disc assembly.
Figure 6:
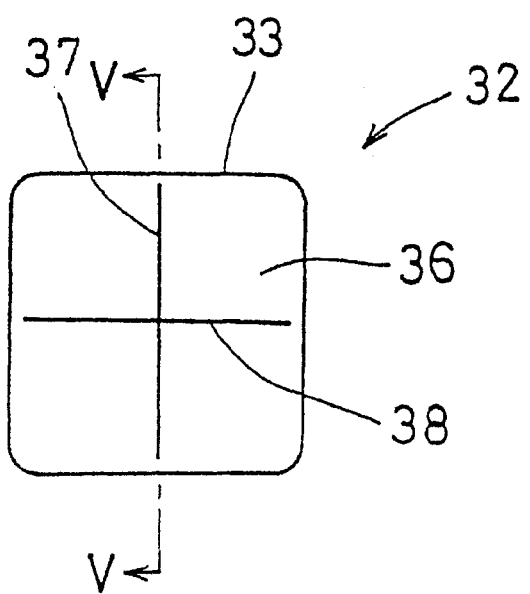
FIG. 6 is an end view of the spring seat depicted in FIG. 5, shown removed from the clutch disc assembly, looking in the direction of the arrow VI of FIG. 5.

As shown in FIG. 4, a small spring 6, a pair of spring seats 32 and a rubber float 31 are disposed within the space defined by the receptacles 2d and 5e. AS is apparent from FIG. 5 and FIG. 6, the spring seats 32 are composed of a spring seat body 33 of square-shaped having a predetermined thickness and a project portion 34 extending from the spring seat body 33. The project portion 34 is formed on a receiving surface 35 of the spring seat body 33. The small coil spring 6 is in contact with the receiving surface 35 and the project portion 34 extends into the small coil spring 6. A contacting surface 36 is formed on a side of the spring seat body 33 such that the receiving surface 35 and the contact surface 36 arc formed on respective opposite sides of the spring seat body 33. The contacting surface 36 of the spring seat body 33 is formed with a depression that is defined by four slanting surface portions that are inclined inward toward a center of the spring seat body 33. Two grooves 37 and 38 arc defined between adjacent slanting surface portions, each of the grooves 37 and 38 having a V-shape when viewed in cross section (see FIG. 5). The grooves 37 and 38 are mutually perpendicular when viewed as shown in FIG. 6. In other words, the contacting surface 36 is divided into four quadrants or sections corresponding to the slanting surface portions, the slanting surface portions being separated by the grooves 37 and 38. The configuration of the grooves 37 and 38 are such that the support portions 2e and 5f contact only one of the grooves 37 or 38 with the spring seat body 33 properly installed. Contact between the support portions 2c and 5f and one of the grooves 37 and 38 restricts movement of the spring seat body 33 therebetween.

In the conventional spring seat, the attaching direction of the spring seat is fixed and the spring seat had to properly be set so as the slanting surface with V-shaped cross section to properly be contact to the support portion. That is, the spring seat had to be set so as the borderline of the slanting surface with V-shaped cross section to extend in the axial direction and just two of four sides of the square can be located in the upper portion. In the spring seat in accordance with the present invention, anyone of four sides of the square can be located in the upper portion, thereby enhancing operation efficiency in attaching the spring seats.

A rubber float 31 (FIG. 4) is disposed inside the coil spring 6.

A clutch plate 3 and retaining plate 4 are disposed on opposite sides of the sub-plate 5. The plates 3 and 4 are substantially a pair of disc-like plates and are rotatably disposed on the outer peripheral side of the boss a 2a of the hub 2. The plates 3 and 4 are fixed to each other at their outer peripheral portions by contact pins 11. Each pin 11 passes through the outside cutaway 5c formed in the sub-plate 5. A predetermined space is kept in the circumferential direction between the contact pins 11 and the outside cutaway 5c, so that the plates 3, 4 and the sub-plate 5 are rotatable relative to each other.

A frictional surface portion 10 is disposed on the outer periphery of the clutch disc 3. The frictional surface portion 10 includes annular cushioning plates 12 and a plurality of frictional facings 13. The annular portion 12a of the cushioning plate 12 is fixed to the clutch plate 3 by the contact pin 11. A plurality of cushioning portions 12b are formed on the outer peripheral side of the cushioning plate 12. Frictional facings 13 are fixed on the opposite sides of the cushioning portion 12b.

The clutch plate 3 and the retaining plate 4 are provided with window holes 3a and 4a at the positions corresponding to the window holes 5b of the sub-plate 5, respectively. Holding portions 3b and 4b raised axially outwardly are formed at axially opposite sides of each of the window holes 3a and 4a.

Four large springs 7 are used in this clutch disc assembly 1, and each of them is disposed within the window holes 5b of the sub-plate 5. Small coil springs are disposed inside the large coil springs 7 which are located at two diametrically opposite positions. The axial movement of the large springs 7 is restrained by the holding portion 4b of the retaining plate 4 and the holding portion 3b of the clutch plate 3.

The friction resistance generating mechanism 8 will now be described.

The friction resistance generating mechanism 8 is composed of the annular members each of which is disposed between the inner peripheral portion of the clutch plate 3 and the inner peripheral portion of the retaining plate 4 in the axial direction as well as on the outer peripheral side of the boss 2a.

The members in the friction resistance generating mechanism 8 include a first friction washer 14, a second friction washer 15, a first conical spring 16, a second conical spring 17 and a third friction washer 18. An annular extending portion 18b which axially toward the engine side is formed on the inner circumferential portion of the third friction washer 18.

The first friction washer 14 is a disc-like member of resin. The first friction washer 14 is in contact with the a side surface on the transmission side of the flange portion 2b of the hub 2. The first conical spring 16 is disposed in a compressed state between the first friction washer 14 and the retaining plate 4 in the axial direction.

The second friction washer 15 is a disc-like member of resin and is disposed on the outer peripheral side of the first friction washer 14. The second friction washer 15 is in contact with the inner peripheral end surface of the sub-plate 5. The first friction washer 14 is shown removed from the clutch disc assembly 1 in FIGS. 12 and 13. The second friction washer 15 is engaged with the first friction washer 14 so as not to rotate relative to it. The second friction washer 15 is provided with a projection having snap a projection 15c (shown in FIG. 1) which is engagable to the retaining plate 4 so as not to rotate relative to it but to be movable to it in axial directions. The second friction washer 15 is shown removed from the clutch disc assembly 1 in FIGS. 15 and 16. The second conical spring 17 is disposed in a compressed state between the second friction washer 15 and the retaining plate 4 in the axial direction.

The third friction washer 18 is disposed between the inner peripheral portion of the clutch plate 3 and the flange portion 2b of the hub 2 and the inner peripheral edge of the sub-plate 5 in the axial direction.

The operation of the clutch disc assembly 1 will now be described.

When the frictional facing 13 comes into pressing contact with a flywheel (not shown) on the engine side, the torque from flywheel on the engine side is transmitted to the clutch plate 3 and the retaining plate 4. This torque is transmitted to the hub 2 through the large coil spring 7, the sub-plate 5 and the small spring 6 and is further outputed to the shaft (not shown) on the transmission side.

Transmitting the twist vibration from a flywheel (not shown) on the engine side to the clutch disc assembly 1 brings about the regular relative rotation between the plates 3, 4 and the hub 2. At this time, the small springs 6 and the large springs 7 are compressed to produce hysteresis torque in the friction resistance generating mechanism 8.

The characteristics of torsion will now be described.

When the torsional displacement between the flywheel on the engine side and the clutch disc assembly 1 is small, the plates 3, 4 rotate together with the sub-plate 5. This causes the hub 2 to rotate relative to them. In this case, the small coil spring 6 is compressed in the circumferential direction, and the first friction washer 14 and the third friction washer 18 is slidably moved along the flange portion 2b of the hub 2. When the torsional displacement between them becomes larger, the rubber float 31 is brought into pressing contact with the spring seat 32. This movement will be continued until the outside gear teeth 2c contact the inside gear teeth 5d. As a result, desired characteristics of low rigidity/low hysteresis torque can be obtained.

When the torsional displacement between the flywheel on the engine side and the clutch disc assembly 1 is large, the sub-plate 5 rotate together with the hub 2. This causes the plates 3,4 to rotate relative to them. In this case, the large coil spring 7 is compressed and the first friction washer 14 is slidably moved along the flange portion 2b of the hub 2, the second friction washer 15 is slidably moved along the inner circumferential side surface of the sub-plate 5, and further, the third friction washer 18 is slidably moved along the flange portion 2b of the hub 2 and the inner circumferential portion of the sub-plate 5. This movement will be continued until the contact pin 11 contacts the cutaway 5c. Resultantly, the characteristics of high rigidity/high hysteresis torque can be obtained.

Advantages of the Invention

In the spring seat in accordance with one aspect of the present invention, during assembly, the assembling operators can bring one of the grooves 37 or 38 of the spring seat into contact with the power input rotary plate and the power output rotary plate. In other words, the orientation of the spring seat is no longer as critical a factor as in the prior art, thereby enhancing operational efficiency in assembling the damper disc assembly and inserting the spring seats.

In the spring seat in accordance with another aspect of the present invention, any one of four orientations of the spring seats may be considered during assembly of the damper disc assembly thereby enhancing operational efficiency in assembling the damper disc assembly.

Second Embodiment

Figure 7:
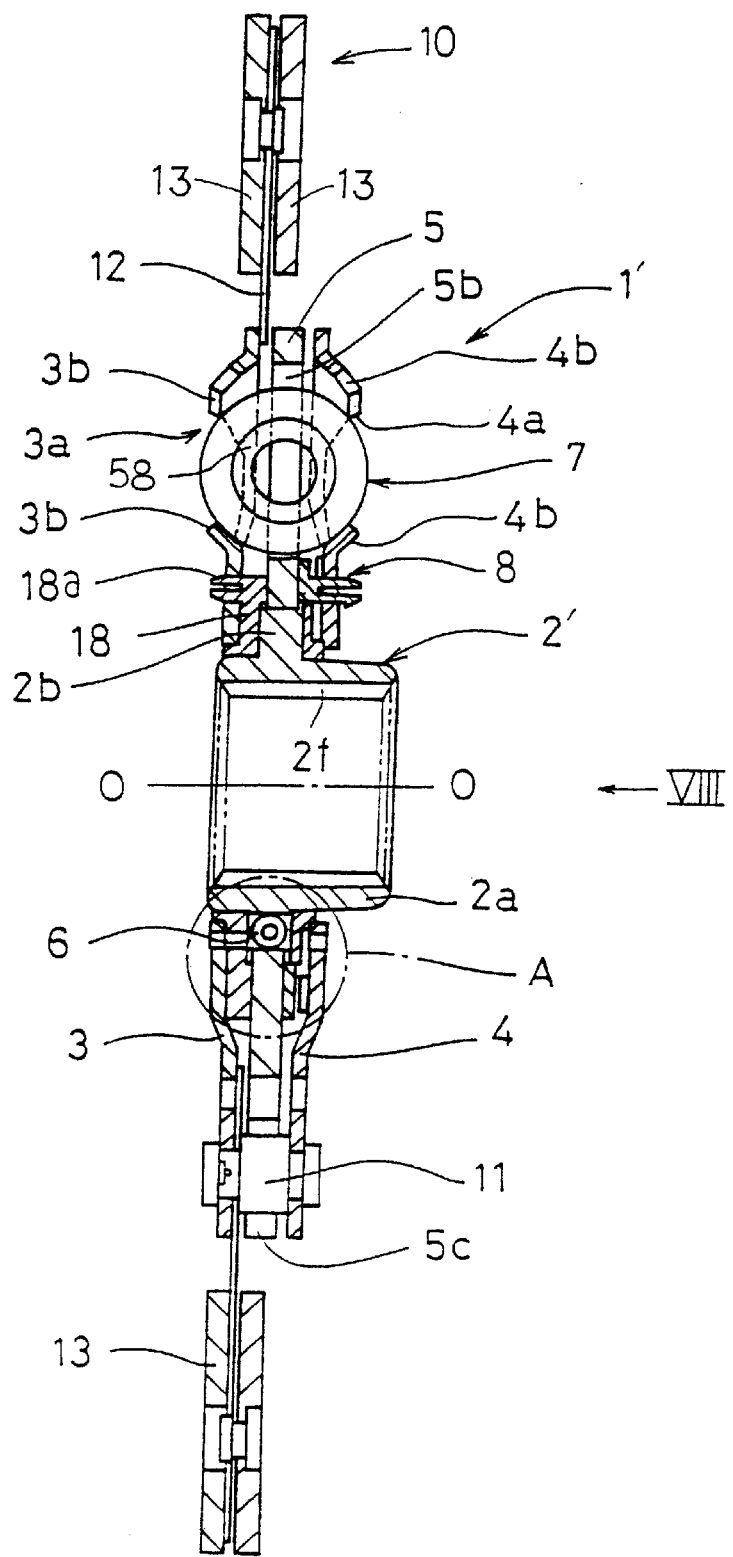
FIG. 7 is a side sectional view showing a clutch disc assembly, similar to FIG. 1, in accordance with a second embodiment of the present invention

A clutch disc assembly 1' according to a second embodiment of the present invention is shown in FIG. 7.

The clutch disc assembly 1' is used to selectively transmit torque from an engine (not shown) located on the left side of FIG. 7 to a transmission (not shown) located on the right side of FIG. 7. In FIG. 7, line O—O designates a rotary axis of the clutch disc assembly 1'. Also, R1 in FIG. 8 and FIG. 17 indicates a rotational direction of the clutch disc assembly 1'.

The clutch disc assembly 1' includes a hub 2' which serves as a power output element, a clutch disc 3 and a retaining plate 4 which serve as power input elements, a sub-plate 5 which serves as an intermediate element, small coil springs 6 disposed between the sub-plate 5 and the hub 2' so as to limit the relative displacement between them, large coil springs 7 disposed between the plates 3,4 and the sub-plate 5 so as to limit the relative displacement between them, and a friction resistance generating mechanism 8 to produce the predetermined amount of friction force upon the relative rotation between the plates 3 and 4 and the hub 2'.

Figure 9:
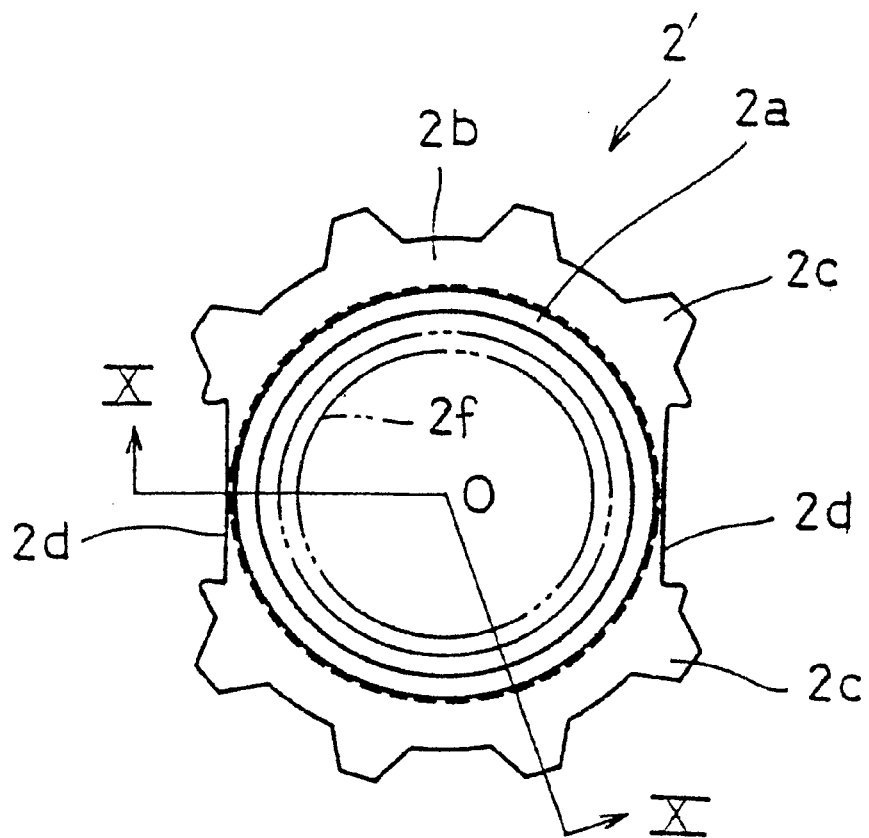
FIG. 9 is an end view of a hub shown removed from the clutch disc assembly depicted in FIGS. 7 and 9, shown on a slightly enlarged scale.
Figure 10:
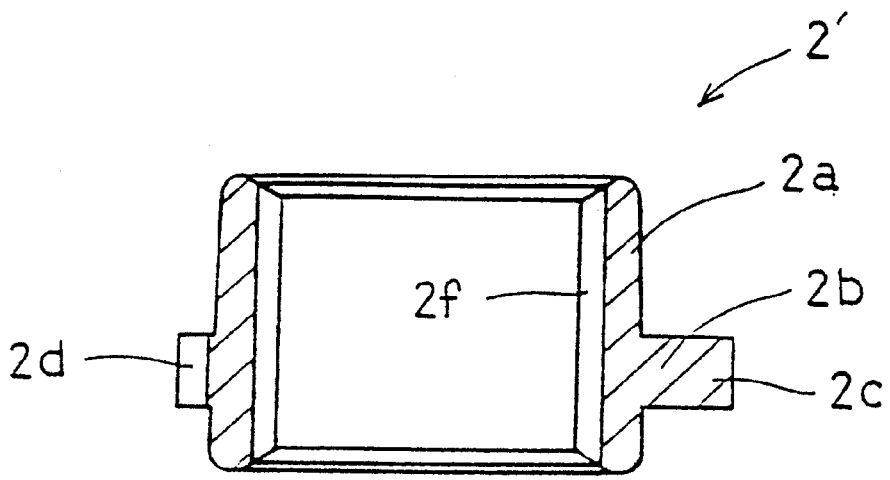
FIG. 10 is a cross sectional view of the hub taken along the line X—X in FIG. 9.
Figure 17:
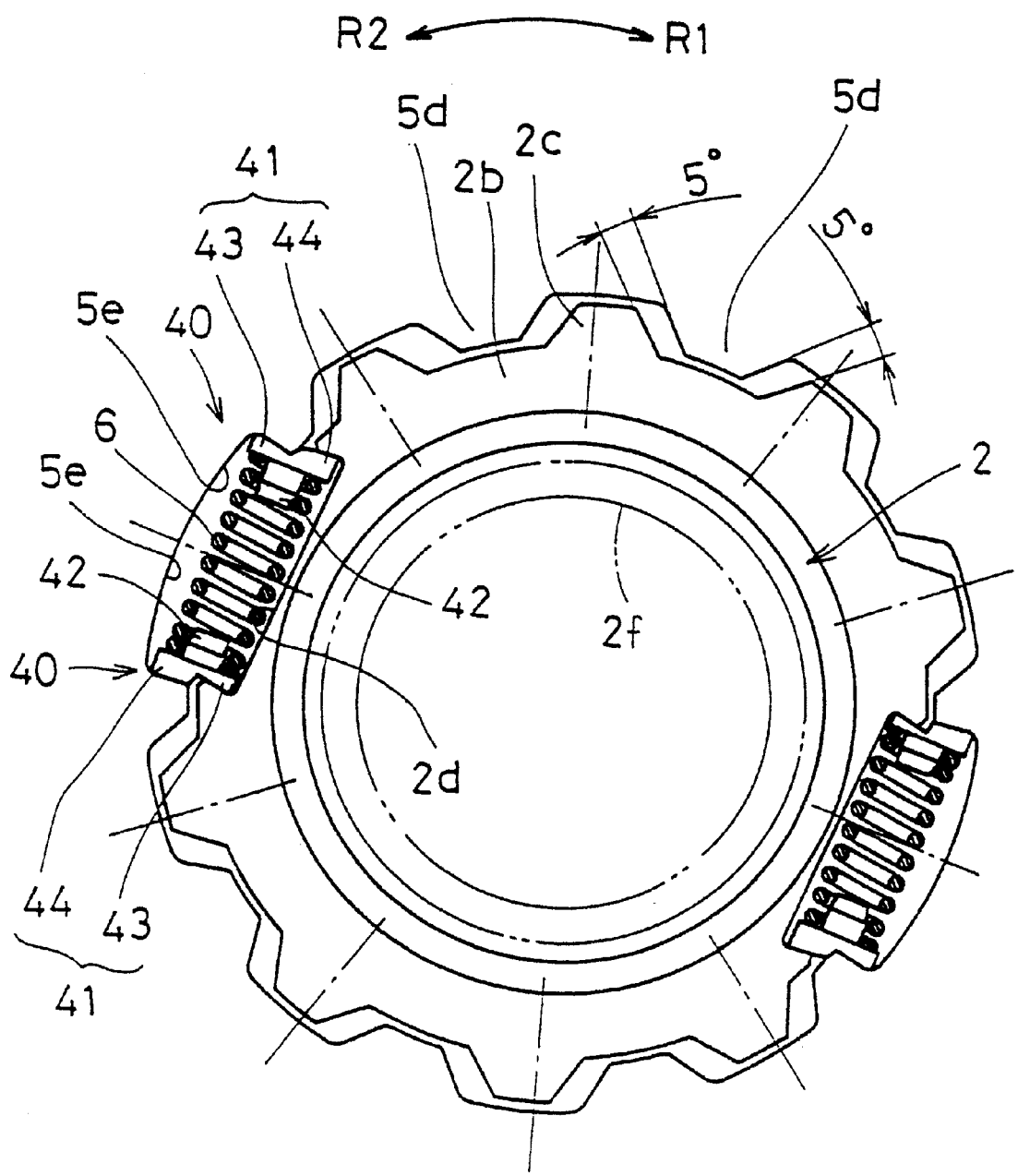
FIG. 17 is a fragmentary view of the hub and a sub-plate of the clutch disc assembly depicted in FIGS. 7 and 8, showing the engagement between the hub and the sub-plate and coil springs disposed therebetween.
Figure 18:
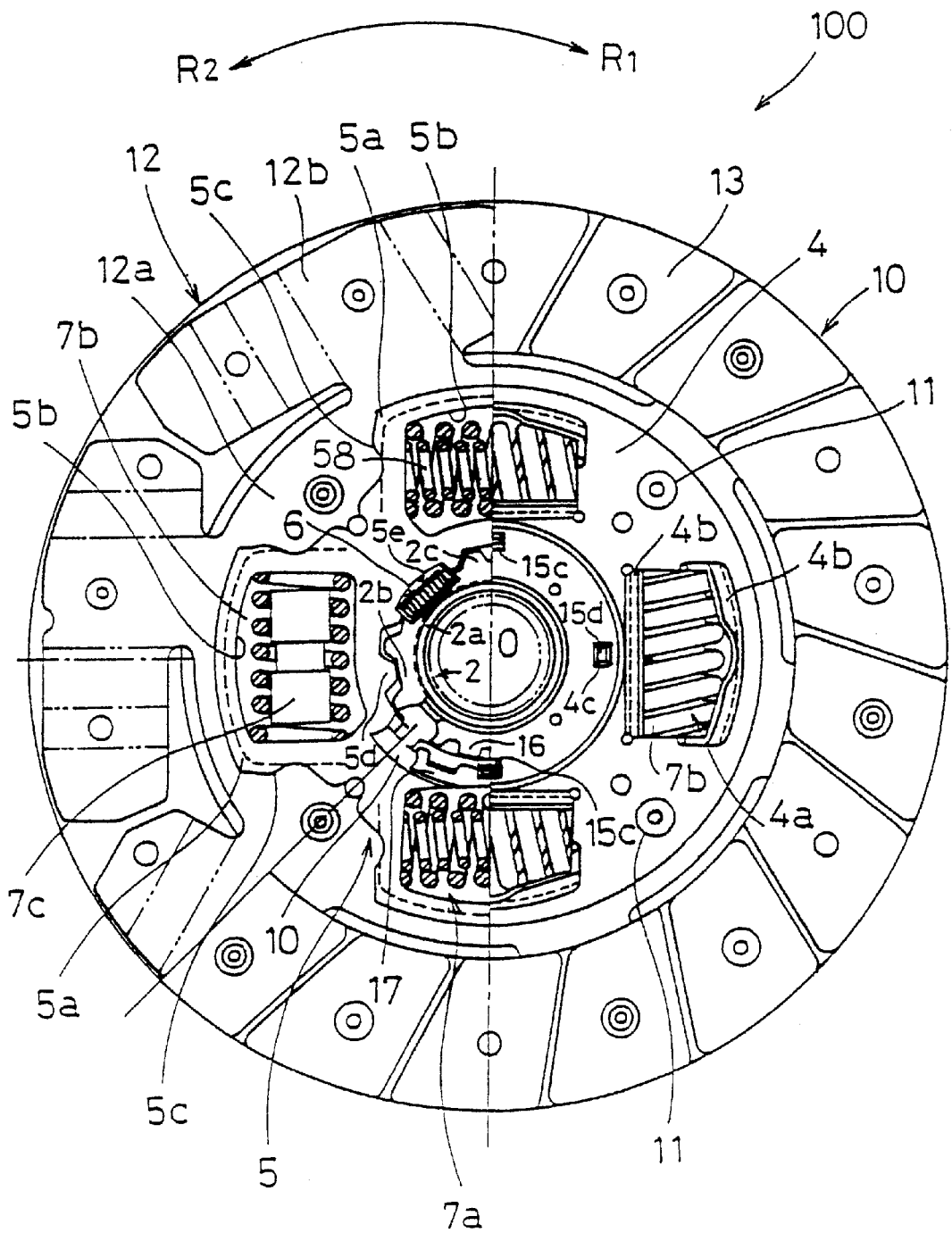
FIG. 18 is a part elevation, part cutaway view similar to FIGS. 2 and 8, of a clutch disc assembly in accordance with a third embodiment of the present invention.

A hub 2' which is connectable to a shaft (not shown) of the transmission is disposed at the center of the clutch disc assembly 1'. The hub 2' includes a cylindrical boss 2a which axially extends and a flange portion 2b integral with the outer circumference of the boss 2a. A plurality of protrusions 2c are formed at regular intervals in the circumferential direction on the outer circumference of the flange portion 2b. As shown in FIGS. 9 and 17, cutaways 2d for receiving the circumferentially opposite ends of the small coil spring 6, described below, are formed at two diametrically opposite positions in the flange portion 2b. Further, the spline hole 2f which is spline-engaged with the shaft (not shown) of the transmission is formed on the inner circumferential side of the boss 2a.

Figure 8:
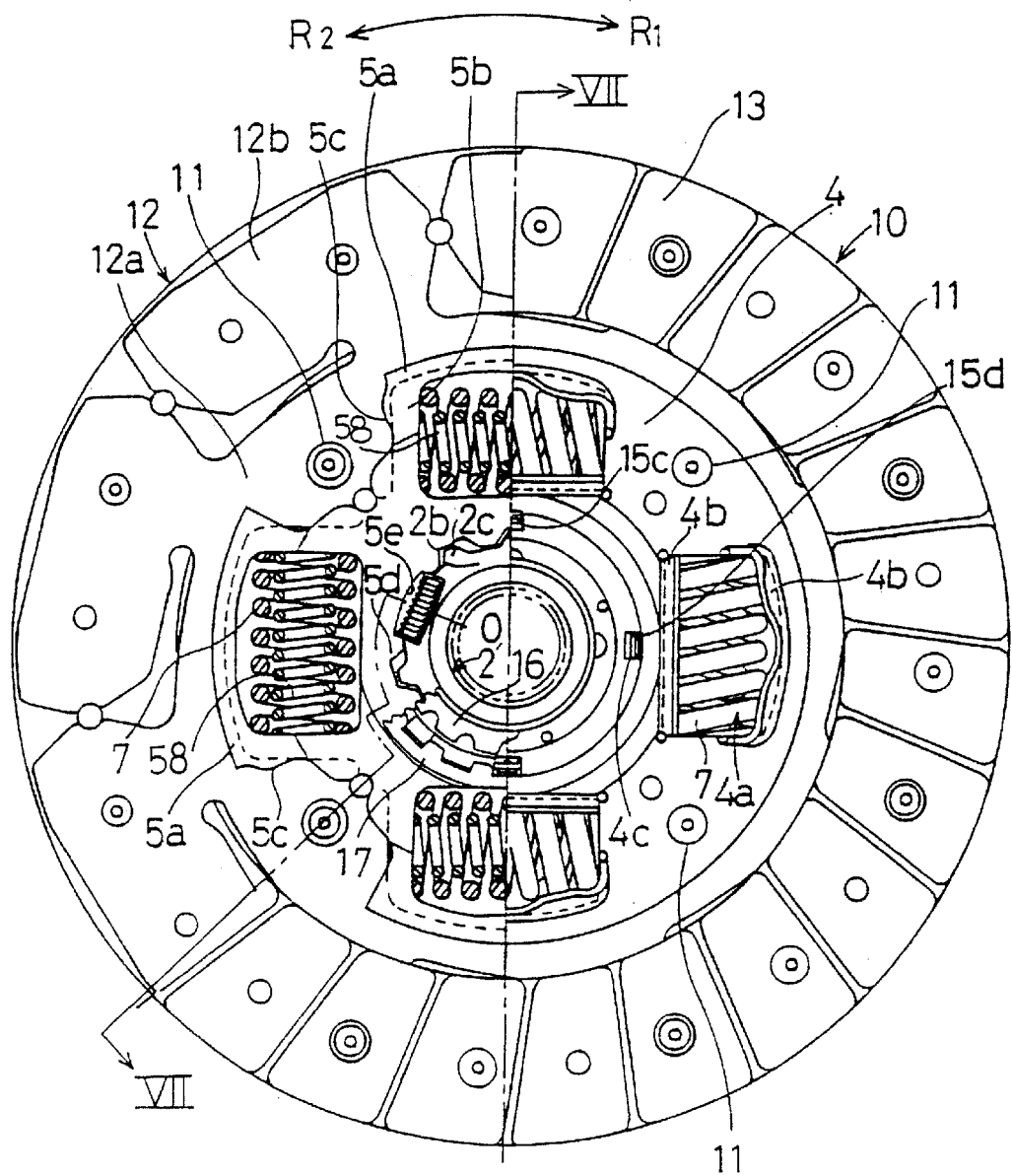
FIG. 8 is a part elevation, part cutaway view of the clutch disc assembly depicted in FIG. 7, looking in the direction of the arrow VIII of FIG. 7.

A sub-plate 5 is disposed on the outer circumferencial side of the flange portion 2b of the hub 2'. The sub-plate 5 is a disc-shaped plate. The sub-plate 5, as is shown in FIG. 8, includes four extending portions 5a which radially outwardly extend. Each of the extending portions 5a is provided with a window hole 5b which extend in the circumferential direction.

Outside cutaway 5c are provided between each of the extending portions Sa. Inwardly extending protrusions 5d are formed on the inner circumferential side of the sub-plate 5 at the positions corresponding to the portions between each of the protrusions 2c of the hub 2'. A predetermined space is provided between the protrusion 2c and the inside protrusion 5d, as is shown in both FIGS. 8 and 17. This allows the hub 2' and the sub-plate 5 to rotate relative to each other by a predetermined angle.

As is shown in both FIGS. 8 and 17, inside receptacles 5e are formed on the inner circumference of the sub-plate 5 at positions corresponding to the cutaways 2d of the hub 2'. Small springs 6 are disposed within the space defined by the cutaways 2d and the inside receptacles 5e. Seat members 40 are disposed on the opposite ends of the small spring 6. As shown in detail in FIG. 17, the seat member 40 includes a seat portion 41 of the disc-shaped and an inserted portion 42 extending from the seat portion 41 to the inside of the small coil spring 6. The seat portion 41 includes a first support portion 43 and a second support portion 44 which extends in the circumferential direction further than the first support portion 43 in the circumferential direction. In other words, the second support portion 44 is thicker than the first support portion 43 extending away from the spring 6. In the seat member 40 on the R1 side, the first support portion 43 is supported by the inside receptacle Se and the second support portion 44 is supported by the cutaway 2d, while in the seat member 40 on the R2 side, the first support portion 43 is supported by the cutaway 2d and the second support portion 44 is supported by the inside receptacle 5e. As a result, the phase of the cutaway 2d is shifted on the R1 side with respect to that of the inside receptacle 5e, as is explained in greater detail below.

Also, with the configuration shown in FIG. 17, the protrusion 2c of the hub 2' in a torsion free state is disposed at a central position between each adjacent inwardly extending protrusions 5d. Further, the hub 2' can rotate relative to the sub-plate 5 from a torsion free state by a displacement angle of 5 degrees in either the R1 direction or the R2 direction.

It should be understood that the seat member 40 may include at least one slanting portion similar to the slanting portions 37 and 38 described above with respect to the first embodiment for retention of the seat member 40 within the receptacles 2d and 5e.

The phase, as mentioned above, refers to two related aspects of the hub 2' and the sub-plate 5. Specifically, as is shown in FIG. 17, the inwardly extending protrusions Sd and the protrusions 2c are shaped such that the protrusions 2c fit uniformly within the gaps between adjacent extending protrusions 5d. In the second embodiment, the protrusions 2c are centered between adjacent extending protrusions 5d. However, in the first embodiment the protrusions 2c are off-center between adjacent extending protrusions 5d. The shift from being centered in the second embodiment to being off-center, as in the first embodiment, is a phase shift. Further, the inside receptacle 5e and the cutaways 2d have generally the same circumferential length but, in the second embodiment in FIG. 17, the inside receptacles 5e and the cutaways 2d are offset from one another due to the orientation of the seat members 40, described above. However, in the first embodiment (FIG. 4) the inside receptacles 5e and the cutaways 2d are generally circumferentially aligned. The orientation of the seat members 40 have caused a phase shift between the inside receptacle 5e and the cutaways 2d in the second embodiment without any change in the orientation or re-design of the inside receptacle 5e and the cutaways 2d or the inwardly extending protrusions 5d and the protrusions 2c.

The shape and position of the inwardly extending protrusions 5d and the protrusions 2c are generally the same as in the first embodiment depicted in FIGS. 1–6. However, because of the shape and orientation of the seat members 40, the protrusions 5d of the sub-plate 5 are no longer offset from the hub 2', but the inside receptacle 5e and the cutaways 2d are offset, unlike the case with the first embodiment where the offset is between the respective protrusions. Hereinafter, the orientation of the seat members 41 as shown in FIG. 17 will be referred to as out-of-phase, since the first support portion 43 and the second support portion 44 are not symmetrically installed in the inside receptacle se and the cutaway 2d. In an alternate condition (not shown but similar to that in the first embodiment) where the first support portion 43 and the second support portion 44 are symmetrically installed in the inside receptacle 5e and the cutaway 2d will hereinafter be referred to as in-phase. Hence the term out-of-phase refers to the condition where the inside receptacle 5e and the cutaway 2d are not circumferentially aligned in a torsion free state. The term in-phase refers to the condition where the inside receptacle 5e and the cutaway 2d are circumferentially aligned in a torsion free state. Therefore, the first embodiment is in-phase and the second embodiment, as shown in FIG. 17 is out-of-phase. It should be appreciated that, with respect to the orientation shown in FIG. 17, if only one of the seat members 41 is reversed (rotated 180°) the phase of the second embodiment will be shifted to an in-phase condition.

If the second embodiment is shifted to an in-phase condition, the protrusion 2c of the hub 2' will be shifted toward the R2 direction between each of the inwardly extending protrusions sd of the sub-plate 5 in a torsion free state. In other words, the hub can rotate relative to the sub-plate 5 in a torsion free state by the angle of 7 degrees on the R1 side while the angle of 3 degrees on the R2 side. That is, the preferred embodiment here effects the alteration of the characteristics of torsion of the conventional construction which includes the hub 2' and the sub-plate 5 which are connected to each other through the small coil spring 6 by modifying the configuration of the seat member 40. In this manner, modifying the configuration of the seat member 40 can be carried out easier and less costlier than that of the changing the cutaway portion in the hub or in the receptacle portion of the sub-plate. Further, each of the seat members 40 has the same configuration thereby reducing the manufacturing cost.

The characteristics of the twist angular displacement to be set are not limited to this preferred embodiment but can be varied.

A clutch plate 3 and retaining plate 4 are disposed on opposite sides of the sub-plate 5. The plates 3 and 4 are substantially a pair of disc-like plates which are rotatably engaged with the outer periphery of boss 2a of the hub 2'. The plates 3 and 4 are fixed to each other at their outer peripheral portions by contact pins 11. Each contact pin 11 passes through an outside cutaway 5c of the sub-plate 5. A predetermined space is kept in the circumferential direction between the contact pin 11 and the outside cutaway 5c, so that the plates 3, 4 and the sub-plate 5 are rotatable relative to each other.

A frictional surface portion 10 is disposed on the outer peripheral portion of the clutch disc 3. The frictional surface portion 10 includes an annular cushioning plates 12 and a plurality of frictional facings 13. An annular portion 12a of the cushioning plates 12 is fixed to the clutch plate 3 by the contact pin 11. A plurality of cushioning portions 12b are formed on the outer peripheral side of the cushioning plates 12. Frictional facings 13 are fixed on the opposite sides of the cushioning portion 12b. A flywheel (not shown) on the engine side is disposed on the left side of FIG. 7 with respect to the frictional facings 13. When the frictional facings 13 are in pressing contact with the flywheel by means of the pressure plate (not shown), the torque on the engine side is inputed to the clutch disc assembly 1'.

The clutch plate 3 and the retaining plate 4 are provided with window holes 3a and 4a at the positions corresponding to the window holes 5b of the sub-plate 5, respectively. The large coil spring 7 is disposed within the space defined by the window holes 3a and 4a. Holding portions 3b and 4b raised axially outwardly on the radially opposite sides of respective window hole 3a and 4a.

Total four large coil springs 7 are used in this clutch disc assembly 1t, and each of them is disposed within each of the window holes 5b. A coil spring 58 of smaller diameter is disposed inside the large coil spring 7. The circumferential opposite ends of the coil springs 7 and 58 are in contact with the circumferential opposite ends of the respective window holes 5b, 3a and 4a.

The radial movement and the axial movement of the large coil springs 7 described above are restricted by the holding portion 4b of the retaining plate 4 and the holding portion 3b of the clutch plate 3.

Four apertures 3c and four apertures 4c which are engaged with a portion of the friction resistance generating mechanism 8 (described below) are formed so as to be circumferentially spaced apart from one another on the inner side of the clutch plate 3 and the retaining plate 4, respectively.

The friction resistance generating mechanism 8 will now be described.

The friction resistance generating mechanism 8 is composed of the annular members each of which is disposed between the inner circumferential portion of the clutch plate 3 and the inner circumferential portion of the retaining plate 4 in the axial direction and on the outer peripheral side of the boss 2a. The friction resistance generating mechanism 8 includes a first friction washer 14, a second friction washer 15, a first conical spring 16, a second conical spring 17 and a third friction washer 18.

Figure 11:
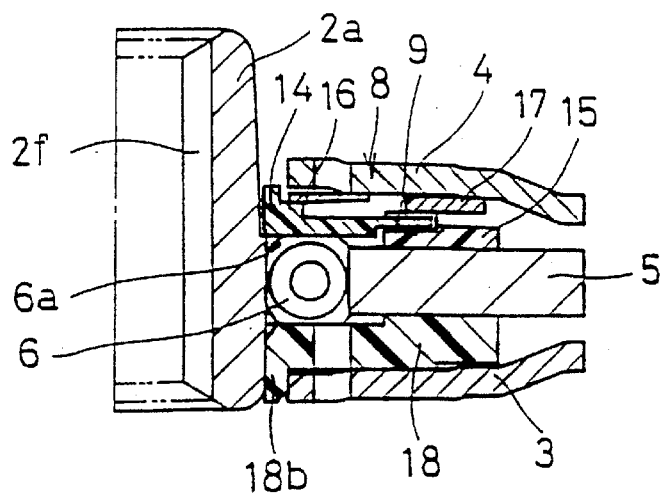
FIG. 11 is a fragmentary view of the clutch disc assembly showing the portion A in FIG. 7 on a slightly enlarged scale, with details of a friction mechanism of the clutch disc assembly.
Figure 12:
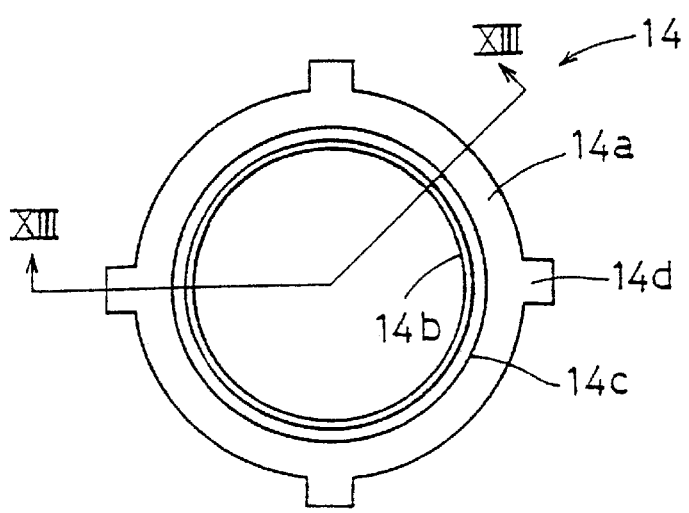
FIG. 12 is an elevational view of a first friction washer shown removed from the friction mechanism depicted in FIG. 11.
Figure 13:
FIG. 13 is a cross sectional view of the first friction washer taken along the line XIII—XIII in FIG. 12, looking in the direction of the arrows.

The first friction washer 14 is a disc-like member made of a resin material. The inner circumferential edge of the first friction washer 14, as shown in FIG. 11, is adjacent to the boss 2a. Also, one side surface of the first friction washer 14 is in contact with the flange portion 2b of the hub 2' and the side surfaces on the transmission side of the protrusion 2c. The first friction washer 14, as shown in FIGS. 11, 12 and 13, includes a disc portion 14a and an annular extending portion 14b which extends from the inner circumferential side of the disc portion 14a to the transmission side. The annular extending portion 14b is provided with an annular groove 14c on its transmission side. Four of radially outwardly extending projections 14d are formed on the outer periphery of the disc portion 14a.

The first conical spring 16 is disposed between the first friction washer 14 and the retaining plate 4 in the axial direction, as is shown in FIGS. 8 and 11. The outer circumferential end of the first conical spring 16 is supported by the retaining plate 4 and the inner circumferential end of the first conical spring 16 is in contact with the annular groove 14c formed on the annular extending portion 14b of the first friction washer 14. The first conical spring 16 is disposed in a compressed state and urges the first friction washer 14 toward the flange portion 2b and the protrusion 2c of the hub 2'. The conical spring 16 is provided with a plurality of cutaways on its outer circumference. These cutaways are provided for the purpose of restraining the variation of the urging force of the first conical spring 16 upon the deformation of the first conical spring due to the wear of the friction washer 14.

Figure 14:
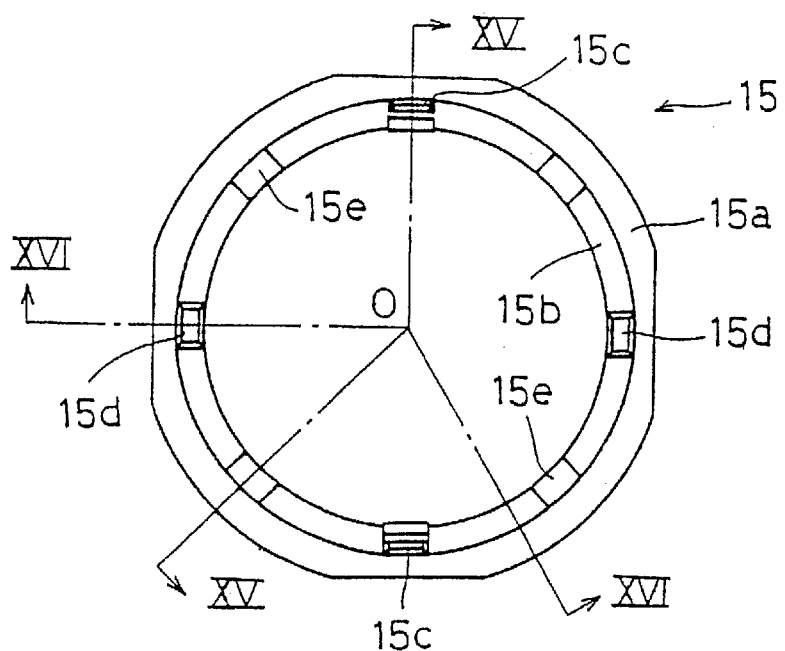
FIG. 14 is an elevational view of a second friction washer shown removed from the friction mechanism depicted in FIG. 11.
Figure 15:
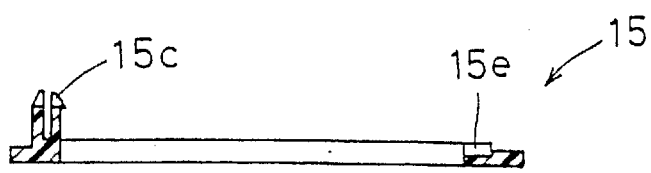
FIG. 15 is a cross sectional view of the second friction washer taken along the line XV—XV in FIG. 14, looking in the direction of the arrows.
Figure 16:
FIG. 16 is a cross sectional view of the second friction washer taken along the line XVI—XVI in FIG. 14, looking in the direction of the arrows.

The second friction washer 15, as is apparent from FIGS. 14, 15 and 16, is a disc-like member, is generally disposed in the same plane as the first friction washer 14, as is shown in FIG. 11. The second friction washer 15 is concentric with the first friction washer 14 on the outer circumferential side of the first friction washer 14. The second friction washer 15 is composed of the same material and has generally the same friction coefficient as the first friction washer 14. The second friction washer 15 includes a disc portion 15a and an annular extending portion 15b which extends from the inner circumferential side of the disc portion 15a to the transmission side. The side surface on the engine side of the disc portion 15a is in contact with the inner circumferential end surface of the sub-plate 5. Four recesses 15e are equidistantly formed in the circumferential direction on the end surface on the transmission side of the annular extending portion 15b. The projection 14d of the first friction washer 14 is engaged with the recess 15e so as not to rotate relative to it in the circumferential direction but to be movable to it in axial directions. A predetermined space is provided between the projection 14d and the recess 15e. The annular extending portion 15b is provided with four projections which extends towards the transmission side between each of the recesses 15e. These projections include two snap projections 15c and two bar-shaped projections 15d. In this embodiment, the same kind of the projections are arranged so as to be facing to each other. The snap projection 15c is divided into two sections by an axially extending slit and is provided with a hook-shaped snap at its tip end. The snap projection 15c is engaged with the aperture 4c formed on the retaining plate 4. The second washer 15 is difficult to remove from the retaining plate 4 in the axial direction by means of the snap portion formed on the snap projection 15c. The bar-shaped projection 15d is engaged with another aperture 4c formed on the retaining plate 4.

Figure 23:
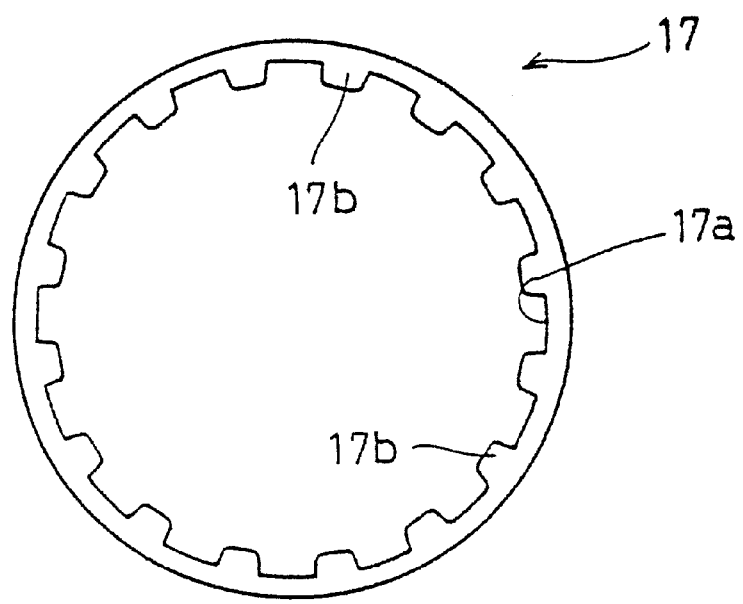
FIG. 23 is an elevational view of a second conical spring shown removed from the friction mechanism depicted in FIG. 19.

The second conical spring 17 is disposed between the second friction washer 15 and the retaining plate 4 in the axial direction. The second conical spring 17 is provided with a plurality of cutaways on its inner periphery, as can be seen in FIG. 23. These cutaways are provide to restrain the variation of the urging force of the second conical spring 17 upon the its deformation due to the wear of the second washer 15. The second conical spring 17 is disposed in a compressed state. The outer circumferential end of the second conical spring 17 is in contact with the retaining plate 4 and the inner circumferential end of the second conical spring 17 or the projection 17b is in contact with the side surface on the transmission side of the annular extending portion 15b of the second friction washer 15. With this arrangement, the second conical spring 17 urges the second friction washer 15 toward the side surface on the transmission side of the sub-plate 5. At this time, the urging force of the second conical spring 17 is set to be larger than that of the first conical spring 16. The cutaways 17a of the second conical spring 17 coincide with the snap projections 15c, the bar-shaped projections 15d and the recesses 15e so as not to interfere with one another.

The third friction washer 18 is disposed between the inner circumferential portion of the clutch plate 3 and the flange portion 2b of the hub 2' and the inner circumferential end of the sub-plate 5, as is shown in FIG. 11. The third friction washer 18 is composed of generally the same material and has generally the same friction coefficient as the first friction washer 14 and the second friction washer 15. The side surface on the transmission side of the third friction washer 18 is in contact with the side surface of the flange portion 2b and the side surface of the inner circumferential end portion of the sub-plate 5. Also, the side surface on the engine side of the third friction washer 18 is in contact with the clutch plate 3. The outer circumferential portion of the third friction washer 18 is provided with snap projections 18a (see FIG. 7) which extend toward the engine side in the axial direction and are engaged with the apertures 3c formed on the clutch plate 3. The snap projections 18a are configured identical to the above mentioned snap projections 15c of the second friction washer 15. An annular extending portion 18b which axially extends toward the engine side is formed on the inner circumferential portion of the third friction washer 18. The outer circumferential portion of the annular extending portion 18b is in contact with the inner circumferential end of the clutch plate 3.

The operation of the clutch disc assembly 1' will now be described.

When the frictional facings 13 are pushed against the flywheel (not shown) on the engine side, the torque of the flywheel on the engine side is inputed to the clutch plate 3 and the retaining plate 4. This torque is transmitted to the hub 2' through the large coil springs 7, the coil springs 8, the sub-plate 5 and the small coil springs 6 and is further outputed to the shaft (not shown) on the transmission side.

The torsional vibration is transmitted from the flywheel (not shown) on the engine side to the clutch disc assembly 1' causes the regularly relative rotation between the plates 3 and 4 and the hub 2'. Each of the coil springs 6, 7 and 8 are then compressed. The friction generated causes a hysteresis-like vibration dampening response which is defined by the relationship between the twist angular displacement and the torsional torque is generated in the friction resistance generating mechanism 8.

When a small twist vibration is transmitted from the flywheel (not shown) on the engine side to the clutch disc assembly 1' producing a small angular displacement, the small coil spring 6 is compressed in the circumferential direction and the first friction washer 14 and the third friction washer 18 is slidably moved along the flange portion 2b and the projections 2c of the hub 2'. In this case, the twist vibration of the small angular displacement is effectively attenuated by the characteristics of the low rigidity/low hysteresis torque.

When a relatively large twist vibration which produces a large angular displacement is transmitted to the clutch disc assembly 1', the small coil springs 6 are compressed and the sub-plate 5 and the hub 2' are rotated together, a relative rotation is generated between these components and the plates 3 and 4. At this time, the large coil springs 7 and the coil springs 8 are compressed and the first frictional washer 14 is slidably moved along the flange portion 2b of the hub 2', the second frictional washer 15 is slidably moved along the side surface on the inner circumferential side of the sub-plate 5, and the third frictional washer 18 is slidably moved along the side surface on the flywheel side of the flange portion 2b of the hub 2' and the side surface on the flywheel side of the inner circumferential side of the sub-plate 5. In this embodiment, the urging force of the second conical spring 17 is set to be larger than that of the first conical spring 16 thereby producing the larger friction force. Due to the above-described high rigidity/large friction characteristics, the twist vibration of large angular displacement may be effectively attenuated.

With the above structure, since the proper friction characteristics can be obtained depending on the type of the twist vibration, the clutch disc assembly 1' can effectively attenuate the twist vibration.

Advantages of the Invention

In the spring seat according to the present invention, the phase of the power input rotary element can be made different from that of the power output rotary element in a torsion free state by shifting the first supported surface supported by the power input rotary element with respect to that of the second supported surface supported by the power output rotary element. This method for altering the phase of the power input rotary element and power output rotary element is carried out readily and inexpensively.

Third Embodiment

A clutch disc assembly 100 in accordance with a third embodiment of the present invention is shown in FIGS. 18 through 26. The third embodiment includes many of the features described above with respect to the first and second embodiments and shown in FIGS. 1 through 17. Those elements in the third embodiment with reference numerals common to the reference numerals in the first and second embodiments are generally the same as described above and therefore description thereof will be omitted. Rather, description will be provided only for those elements in the 2. third embodiment which differ or have been modified compared to similar elements in the first and second embodiments.

The clutch disc assembly 100 includes a first spring assembly 7a and a second spring assembly 7b. The first spring assembly 7a is disposed within the diametrically opposing window holes 5b of the sub-plate 5 and includes the large coil spring 7 and the small coil spring 58 which is disposed inside the torsion spring 7, as is described above with respect to the first and second embodiments. The second spring assembly 7b is disposed within diametrically opposing window holes 5b of the sub-plate 5 and includes a torsion spring 7 and a float rubber 7c which is disposed inside the torsion spring. The circumferentially opposite ends of the torsion spring 7 of the second spring assembly 7b are in contact with the circumferentially opposite ends of the window hole 5b of the sub-plate 5, the circumferentially opposite ends of the window hole 3a of the clutch plate 31 and the circumferentially opposite ends of the window hole 4a of the retaining plate 4. The length of the float rubber 7c here is shorter than the circumferential length of each window hole. That is, the float rubber 7c is movable in the circumferential direction between the circumferentially opposite ends of each window hole.

Figure 20:
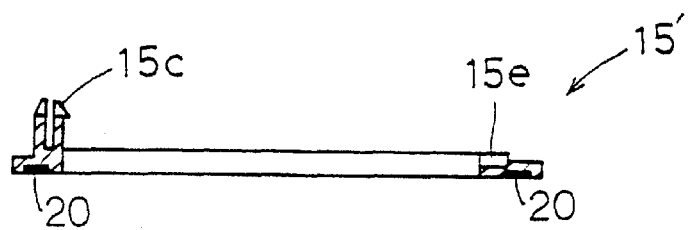
FIG. 20 is a cross sectional view, similar to FIG. 15, of a second friction washer shown removed from the friction mechanism depicted in FIG. 19.
Figure 21:
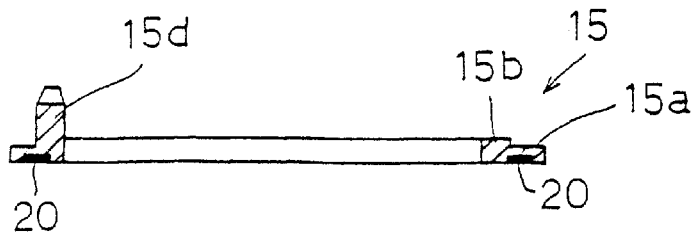
FIG. 21 is a cross sectional view, similar to FIG. 16, of the second friction washer shown removed from the friction mechanism depicted in FIG. 19.
Figure 22:
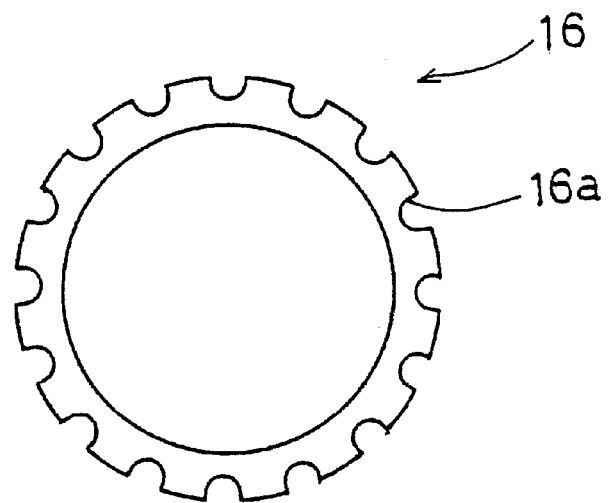
FIG. 22 is an elevational view of a first conical spring shown removed from the friction mechanism depicted in FIG. 19.

A hysteresis torque generating mechanism 8' of the third embodiment will now be described with respect to FIGS. 19 through 25. The hysteresis torque generating mechanism 8' includes many of the elements described above with respect to the first and second embodiments such as the first friction washer 14, the first conical spring 16 and the second conical spring 17. The first conical spring 16 is depicted in FIG. 22 and has been described above. The second conical spring 17 is depicted in FIG. 23 and has been described above. The urging force of the second conical spring 17 is set to be larger than that of the first conical spring 16. The first friction washer 14 is made of, for instance, a nylon-based resin, is depicted in FIGS. 12 and 13 and has been described above.

Figure 24:
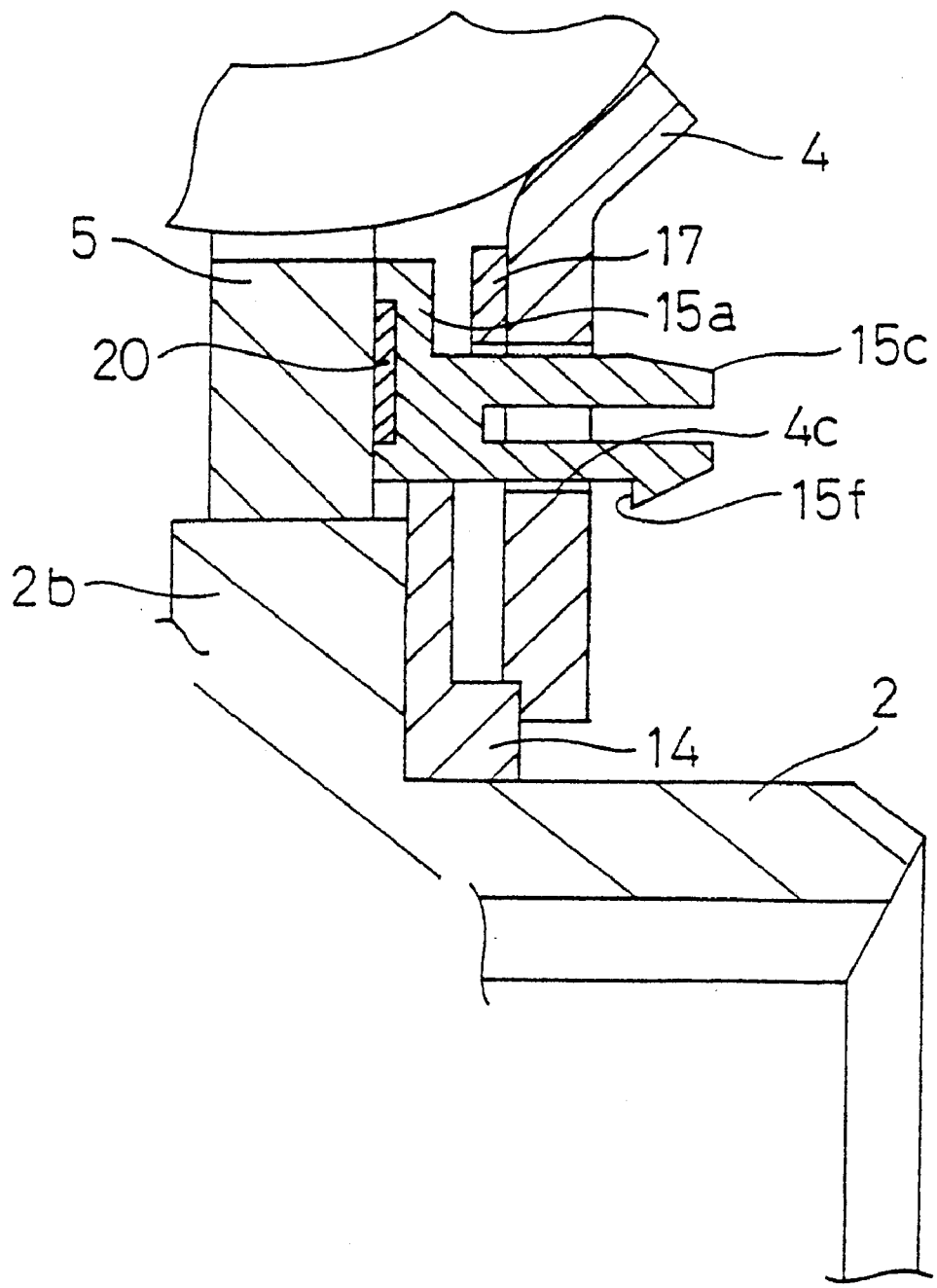
FIGS. 24 and 25 are fragmentary, cross sectional views of the friction mechanism depicted in FIG. 19, shown on a further enlarged scale.

The hysteresis torque generating mechanism 8' also includes a second friction washer 15' which is similar to the second friction washer 15 described above with respect to the second embodiment. The second friction washer 15' includes the disc portion 15a, the annular extending portion 15b, the four recesses 15e the two snap projections 15c and the two bar-shaped projections 15d, as shown in FIGS. 20, 21 and 24. However, in the third embodiment, the second friction washer 15' also includes a molded portion which includes a friction adjusting element 20. The friction adjusting element 20 has a higher coefficient of friction than the second friction washer 15'. The friction adjusting element 20 is made of one of the following: a textile blend of rubber based material, a textile blend of resin material, a fiber-glass re-inforced material or a ceramic material.

Figure 19:
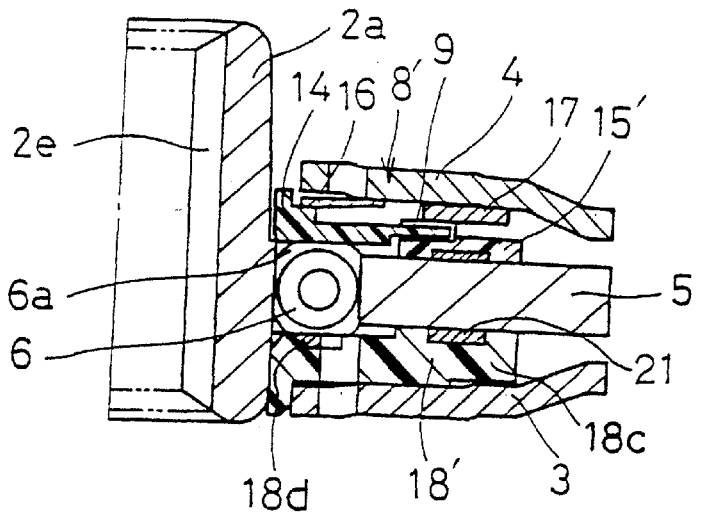
FIG. 19 is fragmentary view of the clutch disc assembly, similar to FIGS. 3 and 11, showing a friction mechanism of the third embodiment of the clutch disc assembly depicted in FIG. 18, on a slightly enlarged scale.
Figure 25:
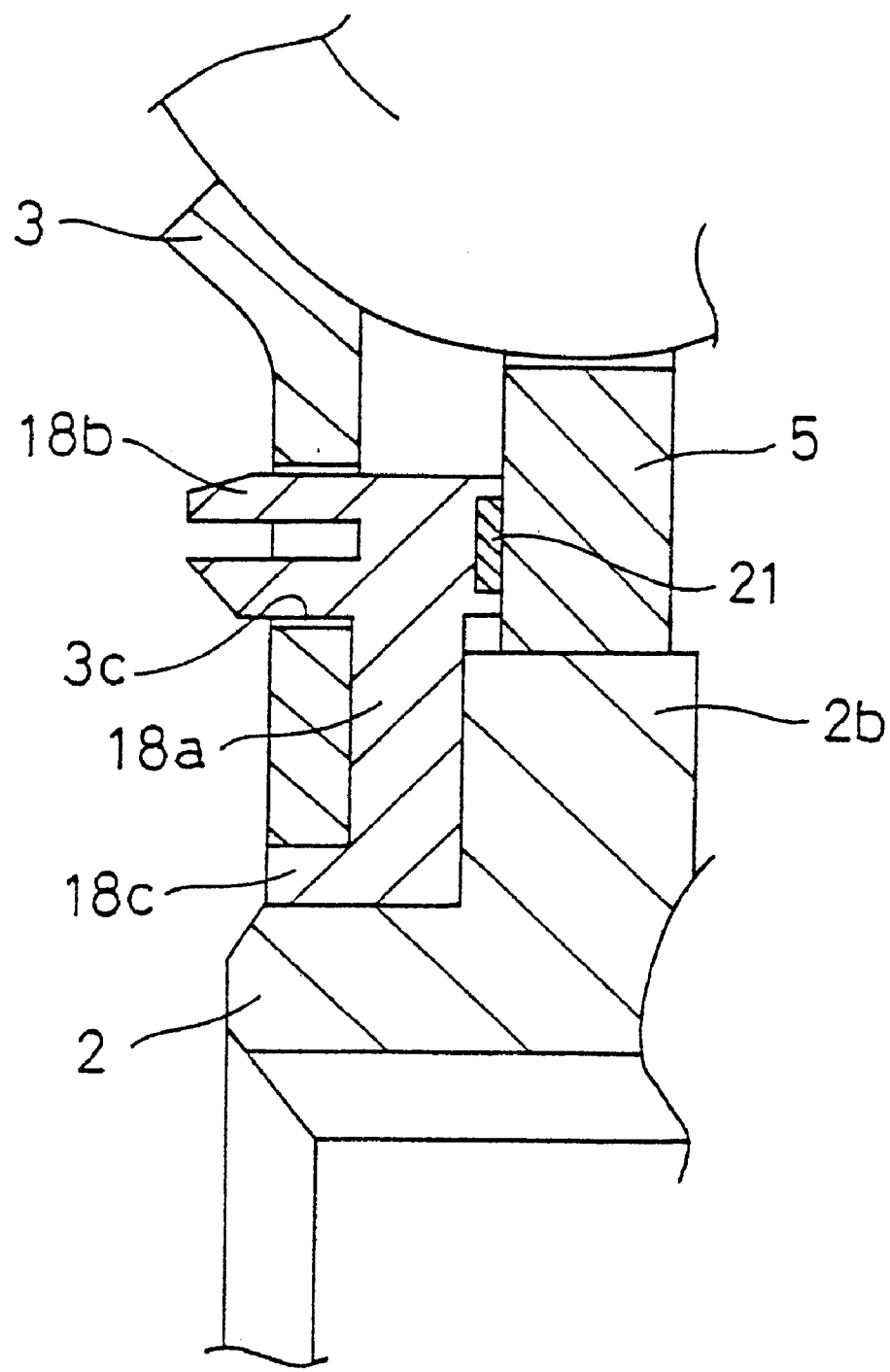

A third friction washer 18' is included in the hysteresis torque generating mechanism 8'. The third friction washer 18' is similar to the third friction washer 18 described above with respect to the second embodiment. The third friction washer 18' includes the snap projections 18a, as shown in FIG. 7 (second embodiment). In the third embodiment, shown in FIGS. 19, and 25, the third friction washer 18' also includes an annular extending portion 18c. The outer periphery of the annular extending portion 18c is in contact with the inner circumferential end of the clutch plate 3. The inner periphery of the annular extending portion 18c is formed with a molded a friction adjusting portion 21 is inserted, as shown in FIGS. 19 and 25. The friction adjusting portion 21 maid from a material having a generally high coefficient of friction, such as a textile blend of rubber based material, a textile blend of resin material, a fiber-glass re-inforced material or a ceramic material.

The operation of the clutch disc assembly 100 will now be described.

When the frictional facings 13 are pushed against the flywheel (not shown) on the engine side, the torque of the flywheel on the engine side is inputed into the plates 3 and 4. This torque is transmitted to the hub 2 through the large spring units 7, the sub-plate 5 and the small torsion springs 6 and is further outputed to the shaft (not shown) on the transmission side.

When a small twist vibration is transmitted from the flywheel (not shown) on the engine side to the clutch disc assembly 1 producing a small angular displacement, a relative rotation is generated between the plates 3 and 4 and the sub-plate 5 and the hub 2. At this time, the small torsion springs 6 are repeatedly compressed and expanded in the circumferential direction and the first friction washer 14 and the third friction washer 18 undergo sliding movement along the flange portion 2b of the hub 2 and the protrusions 2c. In this case, the twist vibration of the small angular displacement is effectively attenuated by the characteristics of the low rigidity/low friction (low hysteresis torque).

When a relatively large twist vibration which produces a large angular displacement is transmitted to the clutch disc assembly 100, the small torsion springs 6 are brought into compression and the sub-plate 5 and the hub 2 are then rotated together, a relative rotation is generated between these components and the plates 3 and 4. At this time, the large spring units 7 are repeatedly compressed and expanded in the circumferential direction, so that the first friction washer 14 undergoes sliding movement along the flange portion 2b of the hub 2, the second friction washer 15 undergoes sliding movement along the inner circumferential side surface of the sub-plate 5 and the third friction washer 18 undergoes sliding movement along the side surface on the flywheel side of the flange portion 2b of the hub 2 and the side surface on the flywheel side of the inner peripheral side of the sub-plate 5. In this case, the urging force of the second conical spring 17 is set to be larger than that of the first conical spring 16, thereby generating a larger friction force. Further, the friction generating surface between the second friction washer 15 and the sub-plate 5 and the friction generating surface between the third friction washer 18 and the sub-plate 5 are respectively provided with friction adjusting elements 20 and 21, thereby generating a still larger friction force. Due to the above-described high rigidity/large friction characteristics (large hysteresis torque), the twist vibration of large angular displacement may be effectively attenuated.

In the clutch disc assembly 100, as described above, the appropriate characteristics of the rigidity/friction can be obtained depending on the variation of the twist vibration, so that the clutch disc assembly 100 is effective to attenuate the twist vibrations.

In assembling the clutch disc assembly 100, the first friction washer 14, the second friction washer 15, the first conical spring 16 and the second conical spring 17 of the hysteresis torque generating mechanism 8' are previously mounted to the retaining plate 4 to constitute a sub assembly. This mounting operation can be easily carried out by only inserting the snap projections 15c and bar-shaped projections 15d of the second bush 15 into the apertures 4c of the retaining plate 4. The second washer 15 is engaged with the retaining plate 4 by means of the snap 15f of the snap projection 15c, so that respective components are difficult to remove. In this manner, constituting the sub assembly can effect the management of the components as a sub assembly in advance of assembling the whole, thereby facilitating the operation. Also, this enhances operation efficiency in assembling the whole due to the advantage of the sub assembly.

Fourth Embodiment

In the third embodiment described above, the friction adjusting elements are seat members having a high friction coefficient are provided on the friction generating surfaces of each friction washer by molding. However, the friction coefficient of the various friction washers may be configured and adjusted in a variety of arrangements. The configuration for adjusting the friction coefficient is not limited to that in the previous embodiment.

Figure 26:
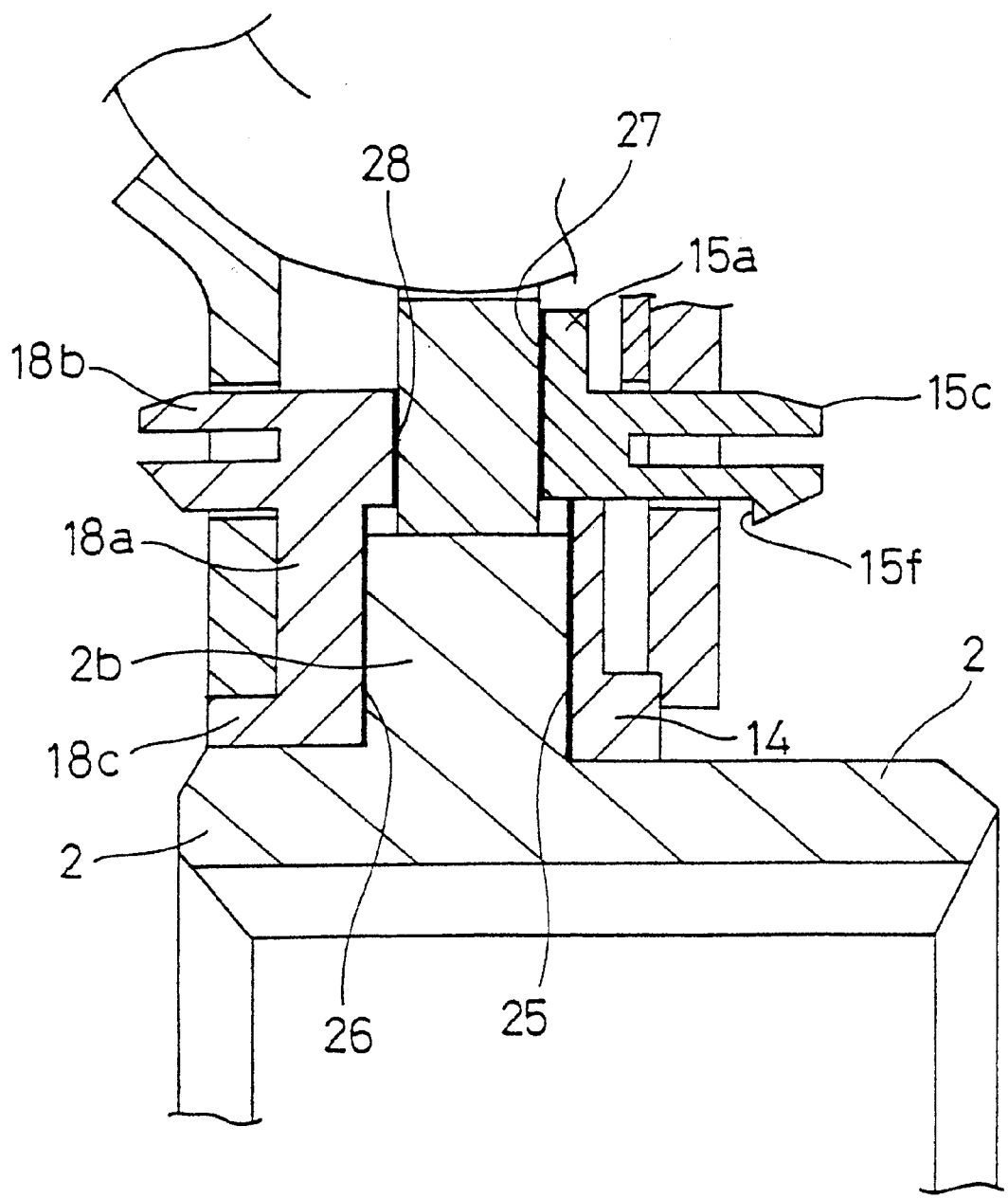
FIG. 26, is a fragmentary, cross sectional view, similar to FIGS. 24 and 25, showing a friction mechanism in accordance with a fourth embodiment of the present invention.

In a fourth embodiment may be as shown in FIG. 26, for example, where the friction generating surfaces between the flange portions 2b and the first friction washer 14 and the friction generating surfaces between the flange portions 2b and the third friction washer 18 are alternatively provided with coatings 25 and 26 to make the friction coefficient of these portions lower that the surface on the second friction washer 15. The coatings 25 and 26 include, for example, zinc or phenolic resin and are formed by flame spray coating. The arrangement may also be that, the friction generating surfaces between the sub-plate and the second friction washer 15 and the friction generating surfaces between the sub-plate 5 and the third friction washer 18 are provided with coatings 27 and 28 formed by, for example, flame spray coating in the same manner as in the coatings 25 and 26 to make the friction coefficient of these portions higher.

For this reason, the small hysteresis torque can be obtained in response to the twist vibration of small amplitude, and the large hysteresis torque can be obtained in response to the twist vibration of large amplitude, thereby effectively attenuating the twist vibration.

The member which stabilizes the friction coefficient can be used as a friction adjusting element. In this case, the friction generating surface can be provided with a coating of, for example, a lubrication member including copper.

Advantages

As described above, the friction element of resin in accordance with the present invention is provided with a member for adjusting the friction coefficient on its friction generating surface. This result in facilitating the adjustment of the friction coefficient of the friction generating surface. Also the stable friction coefficient can readily be obtained in the friction element of resin.

Further, according to the present invention, the friction coefficient of the friction generating surface of the friction element of resin can readily be adjusted, especially, the shock upon speedup/slowdown can efficiently be attenuated.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A spring seat, comprising:
   a spring seat body formed with a contact surface and a receiving surface, each of said surfaces being formed on a respective opposite side of said spring seat body; and
   a projecting portion formed on said receiving surface and extending from a center of said receiving surface, said projecting portion having a generally cylindrical shape, said projecting portion coinciding with a central axis of said spring seat body;
   said contact surface being formed with two transverse slanting grooves, each of said slanting grooves being formed of a pair of sloping groove sections, each groove section generally defining a V-shape in cross section and having an outer end and an inner end, said inner ends intersecting at an intersection point lying in a plane that is closer to said projecting portion than said outer ends, said groove sections being angled relative to each other in a circumferential direction about said central axis to define four quadrants on said contact surface, said four quadrants and said slanting grooves defining a central depression at said intersection point.

2. A spring seat comprising:
   a spring seat body formed with a contact surface and a receiving surface, each of said surfaces being formed on a respective opposite side of said spring seat body; and
   a projecting portion formed on said receiving surface and extending from a center of said receiving surface, said projecting portion having a generally cylindrical shape, said projecting portion coinciding with a central axis of said spring seat body;
   said contact surface being formed with two transverse slanting grooves, each of said slanting grooves being formed of a pair of sloping groove sections, each groove section generally defining a V-shape in cross section and having an outer end and an inner end, said inner ends intersecting at an intersection point lying in a plane that is closer to said projecting portion than said outer ends, said slanting grooves crossing each other at said central axis to define four quadrants on said contact surface, said four quadrants and said slanting grooves defining a central depression at said intersection point, each of said contact surface and said receiving surface having a generally square shape.

3. A damper disk assembly, comprising:
   a hub formed with a flange portion, said flange portion formed with at least one receptacle on an outer portion thereof;
   a sub-plate having a central aperture, said sub-plate being disposed about said hub with said hub extending concentrically through said central aperture, said sub-plate formed with at least one receptacle on an inner portion of said central aperture, said sub-plate receptacle generally corresponding in size and shape to said hub receptacle;
   a spring disposed in said sub-plate receptacle and said hub receptacle elastically coupling said sub-plate to said hub; and
   a pair of spring seats, each of said spring seats comprising
      a spring seat body formed with a contact surface and a receiving surface, each of said surfaces being formed on a respective opposite side of said spring seat body, and
      a projecting portion formed on said receiving surface and extending from a center of said receiving surface, said projecting portion having a generally cylindrical shape. said projecting portion coinciding with a central axis of said spring seat body;
      said contact surface being formed with two transverse slanting grooves, each of said slanting grooves being formed of a pair of sloping groove sections, each groove section generally defining a V-shape in cross section and having an outer end and an inner end, said inner ends intersecting at an intersection point lying in a plane that is closer to said projecting portion than said outer ends, said groove sections being angled relative to each other in a circumferential direction about said central axis to define four quadrants on said contact surface, said four quadrants and said slanting grooves defining a central depression at said intersection point; and wherein one of said spring seats is disposed at one end of said spring within said sub-plate receptacle and said hub receptacle and the other of said spring seats is disposed at the other end of said spring within said sub-plate receptacle and said hub receptacle, said projecting portions at least partially extending into said spring, said receiving surfaces engaging said ends of said spring, one of said slanting grooves of each of said spring seats engaging a portion of said sub-plate receptacle and a portion of said hub receptacle thereby preventing rotation of said spring seats with respect to said sub-plate receptacle and said hub receptacle.

4. The damper disk assembly as set forth in claim 3 wherein said spring seats are configured for engagement with said portion of said sub-plate receptacle and said portion of said hub receptacle in any one of four positions, whereby any one of the four positions may be achieved in response to rotation of said spring seats.

5. A damper disk assembly comprising:

a hub formed with a flange portion, said flange portion formed with at least one receptacle on an outer portion thereof;

a sub-plate having a central aperture, said sub-plate being disposed about said hub with said hub extending concentrically through said central aperture, said sub-plate formed with at least one receptacle on an inner portion of said central aperture, said sub-plate receptacle generally corresponding in size and shape to said hub receptacle;

a spring disposed in said sub-plate receptacle and said hub receptacle elastically coupling said sub-plate to said hub; and a pair of spring seats, each of said spring seats comprising
a spring seat body formed with a contact surface and a receiving surface, each of said surfaces being formed on a respective opposite side of said spring seat body, and
a projecting portion formed on said receiving surface and extending from a center of said receiving surface, said projecting portion having a generally cylindrical shape, said projecting portion coinciding with a central axis of said spring seat body;
said contact surface being formed with two transverse slanting grooves, each of said slanting grooves being formed of a pair of sloping groove sections, each groove section generally defining a V-shape in cross section and having an outer end and an inner end, said inner ends intersecting at an intersection point lying in a plane that is closer to said projecting portion than said outer ends, said slanting grooves crossing each other at said central axis to define four quadrants on said contact surface, said four quadrants and said slanting grooves defining a central depression at said intersection point, each of said contact surface and said receiving surface having a generally square shape; and wherein one of said spring seats is disposed at one end of said spring within said sub-plate receptacle and said hub receptacle and the other of said spring seats is disposed at the other end of said spring within said sub-plate receptacle and said hub receptacle, said projecting portions at least partially extending into said spring, said receiving surfaces engaging said ends of said spring, one of said slanting grooves of each of said spring seats engaging a portion of said sub-plate receptacle and a portion of said hub receptacle thereby preventing rotation of said spring seats with respect to said sub-plate receptacle and said hub receptacle.

6. A spring seat, comprising:

a spring seat body formed with a contact surface and a receiving surface, each of said surfaces being formed on a respective opposite side of said spring seat body; and a projecting portion formed on said receiving surface and extending from a center of said receiving surface, said projecting portion having a generally cylindrical shape, said projecting portion coinciding with a central axis of said spring seat body;

said contact surface being formed with two slanting grooves, each of said slanting grooves generally defining a V-shape in cross section, said slanting grooves defining four quadrants on said contact surface, each of said four quadrants defining a generally planar surface, said four quadrants defining a central depression, each of said slanting grooves intersecting at said central axis.

7. A damper disk assembly, comprising:

a hub formed with a flange portion, said flange portion formed with at least one receptacle on an outer portion thereof;

a sub-plate having a central aperture, said sub-plate being disposed about said hub with said hub extending concentrically through said central aperture, said sub-plate formed with at least one receptacle on an inner portion of said central aperture, said sub-plate receptacle generally corresponding in size and shape to said hub receptacle;

a spring disposed in said sub-plate receptacle and said hub receptacle elastically coupling said sub-plate to said hub; and a pair of spring seats, each of said spring seats comprising
a spring seat body formed with a contact surface and a receiving surface, each of said surfaces being formed on a respective opposite side of said spring seat body, and
a projecting portion formed on said receiving surface and extending from a center of said receiving surface, said projecting portion having a generally cylindrical shape, said projecting portion coinciding with a central axis of said spring seat body;
said contact surface being formed with two slanting grooves, each of said slanting grooves generally defining a V-shape in cross section, said slanting grooves defining four quadrants on said contact surface, each of said four quadrants defining a generally planar surface, said four quadrants defining a central depression, and said slanting grooves intersecting at said central axis; and wherein one of said spring seats is disposed at one end of said spring within said sub-plate receptacle and said hub receptacle and the other of said spring seats is disposed at the other end of said spring within said sub-plate receptacle and said hub receptacle, said projecting portions at least partially extending into said spring, said receiving surfaces engaging said ends of said spring, one of said slanting grooves of each of said spring seats engaging a portion of said sub-plate receptacle and a portion of said hub receptacle thereby preventing rotation of said spring seats with respect to said sub-plate receptacle and said hub receptacle.

* * * * *